US008287370B2

(12) United States Patent
Nittou

(10) Patent No.: US 8,287,370 B2

(45) Date of Patent: Oct. 16, 2012

(54) LIQUID CRYSTAL DISPLAY UNIT, GAME DEVICE AND DISPLAY METHOD FOR USE IN LIQUID CRYSTAL DISPLAY UNIT

(75) Inventor: Eiji Nittou, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 266 days.

(21) Appl. No.: 12/664,856

(22) PCT Filed: Mar. 25, 2008

(86) PCT No.: PCT/JP2008/055578

§ 371 (c)(1), (2), (4) Date: Dec. 15, 2009

(87) PCT Pub. No.: WO2009/013916

PCT Pub. Date: Jan. 29, 2009

(65) Prior Publication Data

US 2010/0184510 A1 Jul. 22, 2010

(30) Foreign Application Priority Data

Jul. 23, 2007 (JP) ................................ 2007-191260

(51) Int. Cl.
*A63F 13/00* (2006.01)

(52) U.S. Cl. .............................. 463/31; 463/30; 463/32

(58) Field of Classification Search .................... 463/16, 463/20, 30–31

See application file for complete search history.

(56) References Cited

U.S. PATENT DOCUMENTS

| | | | | |
|---|---|---|---|---|
| 7,309,285 | B2 * | 12/2007 | Nordman et al. | 463/31 |
| 7,566,269 | B2 * | 7/2009 | B-Jensen et al. | 463/20 |
| 7,971,879 | B2 * | 7/2011 | Loose et al. | 273/138.1 |
| 2003/0176214 | A1 * | 9/2003 | Burak et al. | 463/20 |
| 2004/0036218 | A1 * | 2/2004 | Inoue | 273/292 |
| 2004/0214635 | A1 * | 10/2004 | Okada | 463/30 |
| 2004/0214637 | A1 * | 10/2004 | Nonaka | 463/31 |
| 2004/0219965 | A1 * | 11/2004 | Okada | 463/16 |
| 2005/0026678 | A1 * | 2/2005 | Kaminkow | 463/20 |
| 2005/0054410 | A1 * | 3/2005 | Franco Munoz et al. | 463/16 |
| 2008/0004104 | A1 * | 1/2008 | Durham et al. | 463/20 |

FOREIGN PATENT DOCUMENTS

| | | | | |
|---|---|---|---|---|
| JP | 8-173591 | A | | 7/1996 |
| JP | 10028763 | A | * | 2/1998 |
| JP | 2003-325739 | A | | 11/2003 |

(Continued)

OTHER PUBLICATIONS

Scientry, Inc., Technology: NPD-LCD, Nov. 28, 2006, http://www.scienstry.us/technology.htm.*

(Continued)

*Primary Examiner* — Dmitry Suhol
*Assistant Examiner* — Jason Yen
(74) *Attorney, Agent, or Firm* — Birch, Stewart, Kolasch & Birch, LLP

(57) ABSTRACT

A display unit (1) of the present invention includes: a first liquid crystal display element (20) for displaying an image; a character object (62) disposed behind the first liquid crystal display element (20); a second liquid crystal display element (30) disposed between the first liquid crystal display element (20) and the character object (62), for shielding the character object (62); and a character object shielding section (64) which is a mechanical shielding device, disposed behind the second liquid crystal display element (30), for shielding the character object (62).

3 Claims, 12 Drawing Sheets

FOREIGN PATENT DOCUMENTS

| | | | | |
|---|---|---|---|---|
| JP | 2005-125008 | A | | 5/2005 |
| JP | 2005-137808 | A | | 6/2005 |
| JP | 2005-185624 | A | | 7/2005 |
| JP | 2005185624 | A | * | 7/2005 |
| JP | 2005-253694 | A | | 9/2005 |
| JP | 2005253694 | A | * | 9/2005 |
| JP | 2006-263250 | A | | 10/2006 |
| JP | 2007-111138 | A | | 5/2007 |
| JP | 2007-181476 | A | | 7/2007 |
| JP | 2007181476 | A | * | 7/2007 |

OTHER PUBLICATIONS

Kenplas Industry Ltd., What is PET, Nov. 8, 2002, http://www.kenplas.com/project/pet/.*

* cited by examiner

LIQUID CRYSTAL DISPLAY UNIT, GAME DEVICE AND DISPLAY METHOD FOR USE IN LIQUID CRYSTAL DISPLAY UNIT

TECHNICAL FIELD

The present invention relates to a liquid crystal display unit, a game device, and a display method for use in a liquid crystal display unit, and particularly relates to a display unit capable of switching between shielding and non-shielding of a character object.

BACKGROUND ART

Conventionally, a liquid crystal element has been generally used as a component of an information display section provided in a game device such as a pachinko machine.

It is necessary that such a recent game device display, on its information display section, displays a character object that is disposed behind the liquid crystal display element together with information on the liquid crystal display panel of the liquid crystal display device. The following description explains this with reference to FIG. 17 that schematically illustrates a configuration of a game device and (a) through (c) of FIG. 18 each illustrating a display of an information display section of the game device.

Specifically, as illustrated in FIG. 17, a game device 90 has a front surface on which a round game board 92 is provided so as to show a state of a game. The game board 92 has an information display section 94, constituted mainly by a liquid crystal display element, which is provided in substantially the center of the game board 92.

The information display section 94 displays various information according to situations of the game. For example, in a case where the game device 90 has a three-digit number that changes depending on situations of the game like a slot machine, the information display section 94 displays a number such as “567” as illustrated in (a) of FIG. 18, on the liquid crystal panel of the liquid crystal display element.

When the three-digit number coincides with a predetermined number such as “777” shown in (b) of FIG. 18, the region, where the number “7” in the center of the three-digit number is displayed, becomes transparent. As a result, as illustrated in (c) of FIG. 18, the information display section 94 displays (i) the numbers “7” and “7” that are displayed on the liquid crystal display panel and (ii) a character object 62 (doll) that is disposed beforehand at a rear of the liquid crystal display element.

(Patent Literature 1)

Various techniques have been proposed to attain such a display.

For example, Patent Literature 1 discloses a technique in which a polymer-dispersed liquid crystal is used as an LCD shutter. The following describes this technique with reference to FIGS. 19 to 22. FIG. 19 is a front view illustrating a configuration of an entire game device disclosed in Patent Literature 1. As illustrated in FIG. 19, a game device 101 disclosed in Patent Literature 1 includes a center case 111 in a center part of its game board 106. An image display device 108 is provided in the center case 111 for displaying images.

More specifically, as illustrated in FIG. 20 which is an exploded perspective view illustrating a configuration of the center case 111, the center case 111 mainly includes an armor section 409, the image display device 108, and a character object 506 provided behind the image display device 108.

Furthermore, as shown in FIG. 21 which is an explanatory diagram illustrating a configuration of the image display device 108, the image display device 108 includes a first liquid crystal panel 501, diffusing plates 502, a light guide plate 503, a reflective plate 504, and an LCD shutter 50, provided in this order. Moreover, an image display LCD light source 513 is provided near one end of the light guide plate 503, and a character object lighting source 514 is provided near one end of the LCD shutter 505.

According to the game device 101 disclosed in Patent Literature 1, the LCD shutter 505 of the image display device 108 is realized by polymer-dispersed liquid crystal. This causes switching between visibility and invisibility of the character object 506. The following description explains this with reference to (a) and (b) of FIG. 22, which is an explanatory diagram of an operation principle of the polymer-dispersed liquid crystal by which the LCD shutter 505 is realized. (a) of FIG. 22 illustrates how liquid crystal molecules are aligned while a voltage is being applied to the liquid crystal, and (b) of FIG. 22 illustrates how the liquid crystal molecules are aligned while no voltage is applied to the liquid crystal.

As shown in (a) and (b) of FIG. 22, the polymer-dispersed liquid crystal has a light transmitting state which differs depending on whether or not a voltage is applied to its liquid crystal layer. Specifically, while a voltage is being applied to the liquid crystal layer, light transmits through the polymer-dispersed liquid crystal (LCD shutter 505: ON) as illustrated in (a) of FIG. 22, and therefore a game player can see the character object 506 behind the image display device 108.

On the other hand, while no voltage is applied to the liquid crystal layer, light is scattered by the polymer-dispersed liquid crystal, thereby causing cloudiness in the liquid crystal (LCD shutter 505: OFF). As a result, the game player cannot see the character object 506 behind the image display device 108.

It is thus possible, by using the polymer-dispersed liquid crystal, that the game device 101 disclosed in Patent Literature 1 controls visibility (non-shielded/shielded) of the character object 506 behind the image display device 108.

CITATION LIST

Patent Literature 1

Japanese Patent Application Publication, Tokukai, No. 2005-185624 A (Publication Date: Jul. 14, 2005)

SUMMARY OF INVENTION

However, the conventional game device disclosed in Patent Literature 1 has a problem that the character object behind the image display unit (liquid crystal display element) is insufficiently shielded.

More specifically, in the conventional game device, the character object behind the image display device is shielded by use of polymer-dispersed liquid crystal. In other words, as described above, the polymer-dispersed liquid crystal is made cloudy by use of the polymer dispersed liquid crystal by which incident light is scattered while no voltage is applied to the polymer dispersed liquid crystal, so as to shield the character object behind the image display device.

With the above method, the entire liquid crystal layer becomes clouded due to the light scattering, and therefore an outline and color(s) of the character object become unclear. However, although vague, the game player could still recognize the presence of the character object.

Therefore, since the game player has already recognized the presence of the character object during the light-scattering state, an excitement, felt by the game player when a display is switched by a change in state of the polymer-dispersed liquid crystal from the light-scattering state to a transmitting state so that the character object is clearly shown, becomes low.

The present invention is accomplished in view of the foregoing problem, and its object is to realize a liquid crystal display unit, a game device, and a display method for use in a liquid crystal display unit, each of which can sufficiently shield a character object behind a display device.

In order to solve the problem, a liquid crystal display unit of the present invention includes: a first liquid crystal display element for displaying an image; a character object disposed behind the first liquid crystal display element; a second liquid crystal display element disposed between the first liquid crystal element and the character object, for shielding the character object; and a mechanical shielding device, disposed behind the second liquid crystal display element, for shielding the character object.

Moreover, in order to solve the problem, a display method for causing a liquid crystal display unit to display, the liquid crystal display unit including: a first liquid crystal display element for displaying an image; a character object disposed behind the first liquid crystal display element; and a second liquid crystal display element disposed between the first liquid crystal display element and the character object, for shielding the character object, is a display method including the step of: switching between (i) a display in which just an image displayed on the first liquid crystal display unit is shown to a viewer of the first liquid crystal display element while the character object is being shielded and (ii) a display in which the character object is shown to the viewer instead of shielding the character object, the switching being carried out by a mechanical shielding device, disposed behind the second liquid crystal display element, for shielding the character object.

According to the configuration, a mechanical shielding device is provided together with a liquid crystal display element as means for shielding a character object from a viewer of a liquid crystal display unit (make a character object invisible from a viewer of a liquid crystal display unit).

The mechanical shielding device here denotes a device that shields an object (character object) according to movement of a light non-transmitting member caused by an operation to shield light reflected from the object, and is different from light shielding means in which light transmittance is reduced by birefringence, light-scattering, or the like of a liquid crystal display element or the like.

In the liquid crystal display unit, the mechanical shielding device is provided between the viewer of the liquid crystal display unit and the character object. Thus, even if the character object is insufficiently shielded by the liquid crystal display element (second liquid crystal display element), the character object is sufficiently shielded from the viewer of the liquid crystal display unit.

That is to say, according to the configuration, it is possible to realize a liquid crystal display unit and a display method for use in a liquid crystal display unit, each of which can sufficiently shield a character object disposed behind a display unit.

Moreover, according to the configuration, together with the mechanical shielding device, a liquid crystal display element (second liquid crystal display element) for shielding a character object is provided.

Thus, in a case where the second liquid crystal display element operates in connection with the mechanical shielding device, it is possible to make an operation state of the mechanical shielding device difficult to see from the viewer of the liquid crystal display unit.

The second liquid crystal display element operating in connection with the mechanical shielding device denotes, for example, making the second liquid crystal display element that is provided closer to the viewer than the mechanical shielding device to be in a character object shielding state just before the mechanical shielding device is operated.

As a result, the viewer cannot easily see the operation of the mechanical shielding device.

The liquid crystal display unit according to the present invention may be configured in such a manner that the mechanical shielding device is a rotatable drum device, the drum device has a rotating surface which has a transmitting part that transmits light and a non-transmitting part that does not transmit light, the character object is disposed inside the drum device, and the character object is switched between a non-shielded state and a shielded state in accordance with a rotation of the drum device causing the transmitting part or the non-transmitting part to be disposed between the first liquid crystal display element and the character object.

Moreover, in the method according to the present invention for causing the liquid crystal display unit to display, the mechanical shielding device is a rotatable drum device, the drum device has a rotating surface which has a transmitting part that transmits light and a non-transmitting part that does not transmit light, the character object is disposed inside the drum device, just an image displayed on the first liquid crystal display unit is displayed while the non-transmitting part is being disposed between the viewer and the character object after a rotation of the drum device, whereas the character object is displayed while the transmitting part is being disposed between the viewer and the character object.

According to the configuration, the mechanical shielding device is a rotating drum. Thus, it is possible to easily switch between non-shielding and shielding of the character object, just by rotating the drum.

The liquid crystal display unit according to the present invention is configured in such a manner that at least one pair of straight-piped light source lamps is disposed between the second liquid crystal display element and the drum device, the at least one pair of straight-piped light source lamps extending in a direction in which a rotating shaft extends, and the non-transmitting part of the rotating surface is made of a reflective member.

According to the configuration, the non-transmitting part is configured by a reflective member, and since the non-transmitting part is provided on a rotating surface, the non-transmitting part has a curved surface.

When the character object is shielded, the non-transmitting part is to be disposed on a front side of the character object, so that light emitted from a light source or light from outside reaches an outer surface of the curved surface of the non-transmitting part. Further, since the non-transmitting part has a curved surface, the light is easily scattered to various directions. As a result, the scattered light can act as a backlight of the first liquid crystal display element that is provided in front of the mechanical shielding device. Thus, it is possible to brighten a display of an image displayed on the first liquid crystal display element and also to improve uniformity in brightness distribution on its display surface.

On the other hand, when the character object is not shielded (when the character object is shown to the viewer of the liquid crystal display unit), the non-transmitting part is disposed behind the character object. This allows the light to reach an inner surface of the curved surface of the non-transmitting part. Since the light is reflected from the inner surface of the curved surface, the light is easily converged. As a result, the character object is readily illuminated. This allows the viewer to see a bright and clear character object.

Further, according to the configuration, a light source lamp is provided between the second liquid crystal display element and the drum device. Hence, it is possible to further improve the brightness of the image displayed on the first liquid crystal display element while the character object is shielded, as described.

Moreover, according to the configuration, as the light source lamp, one pair of light source lamps is provided along a direction in which a rotating shaft of the drum device extends. As a result, while the character object is shielded, light emitted from the light source lamp reflects from an outer side of the curved surface of the non-transmitting part, thereby allowing easy dispersion of light on a display surface more uniformly.

Therefore, it is possible to improve not only the brightness of the image displayed on the first liquid crystal display element, but also uniformity of brightness distribution on the display surface.

The liquid crystal display unit according to the present invention is preferably configured in such a manner that the non-transmitting part is made from white polyethylene terephthalate film, and the transmitting part is made from transparent polyethylene terephthalate film.

According to the configuration, the non-transmitting part is made from a white polyethylene terephthalate (PET) film. Thus, it is possible to attain a good scatter reflection.

Moreover, the transmitting part is made from a transparent polyethylene terephthalate film. Thus, it is possible to clearly show the character object.

The non-transmitting part and the transmitting part are made from films made of identical material. Thus, a rotating surface of the drum device is easily formed by connecting the white polyethylene terephthalate film and the transparent polyethylene terephthalate film together, and thereafter bending this connected film to form a cylindrical shape.

The liquid crystal display unit according to the present invention may be configured in such a manner that the mechanical shielding device is a sliding shutter device having a shutter, and the character object is switched between a non-shielded state and a shielded state in accordance with opening and shutting of the shutter.

Moreover, the liquid crystal display unit according to the present invention may be configured in such a manner that the mechanical shielding device is a roll-up shutter device having a shutter, and the character object is switched between a non-shielded state and a shielded state in accordance with opening and shutting of the shutter.

According to the configuration, the mechanical shielding device is a sliding shutter device or a roll-up shutter device. Hence, it is possible to realize a desirable mechanical shielding device by use of a general-purpose and simple mechanism.

The liquid crystal display unit according to the present invention is preferably configured in such a manner that the second liquid crystal display element is a polymer-dispersed liquid crystal display element.

According to the configuration, the second liquid crystal display element provided behind the first liquid crystal display element displaying an image is the polymer-dispersed liquid crystal display element.

Hence, it is possible to display an image displayed on the first liquid crystal display element more brightly. A description of this follows below.

Namely, a polymer-dispersed liquid crystal, as described earlier, scatters light while no voltage is applied to its liquid crystal layer.

When light (for example if a light source is provided inside a liquid crystal display unit, then that light emitted from the light source (light source light), or outer light (e.g. natural light, indoor light) in a case where a light source is not provided) reaches the second liquid crystal display element while the second liquid crystal display element is in this scattering state, the light is reflected in a scattering manner or the light brightens the second liquid crystal display element itself.

As a result, the second liquid crystal display element provided behind the first liquid crystal display element demonstrates the same function as a backlight, thereby displaying the image displayed on the first liquid crystal display element more brightly.

Generally, polymer-dispersed liquid crystal display elements have low light shielding effects, thereby causing insufficient shielding of the character object. However, the liquid crystal display unit of the present invention has the mechanical shielding device as described earlier, thereby sufficiently shielding the character object from the viewer.

A game device according to the present invention preferably includes the liquid crystal display unit.

According to the configuration, the liquid crystal display unit provided in the game device sufficiently shields the character object that is disposed behind the display device. Hence, it is possible for a game player of the game device to enjoy an exciting game.

In the display method according to the present invention for causing a liquid crystal display unit to display, the second liquid crystal display element is a polymer-dispersed liquid crystal display element, and the polymer-dispersed liquid crystal display element is in a scattering state while the drum device is being rotated.

According to the method, the second liquid crystal display element is in a scattering state while the drum device is rotated. Thus, it is difficult for the viewer to recognize the rotation of the drum device. Thus, the display of the first liquid crystal display unit and that of the character object are switched in high quality and with more excitement.

As described above, a liquid crystal display unit according to the present invention disposes a mechanical shielding device behind the second liquid crystal display element, which mechanical shielding device is for shielding a character object.

Moreover, a display method according to the present invention, for causing a liquid crystal display unit to display, is a method including the step of: switching between (i) a display in which just an image displayed on the first liquid crystal display unit is shown to a viewer of the first liquid crystal display element while the character object is being shielded and (ii) a display in which the character object is shown to the viewer instead of shielding the character object, the switching being carried out by a mechanical shielding device, disposed behind the second liquid crystal display element, for shielding the character object.

Thus, such an effect is attained that a liquid crystal display unit and a display method for use in a liquid crystal display unit are realized, each of which can sufficiently shield a character object disposed behind a display unit.

REFERENCE SIGNS LIST

Figure 1:
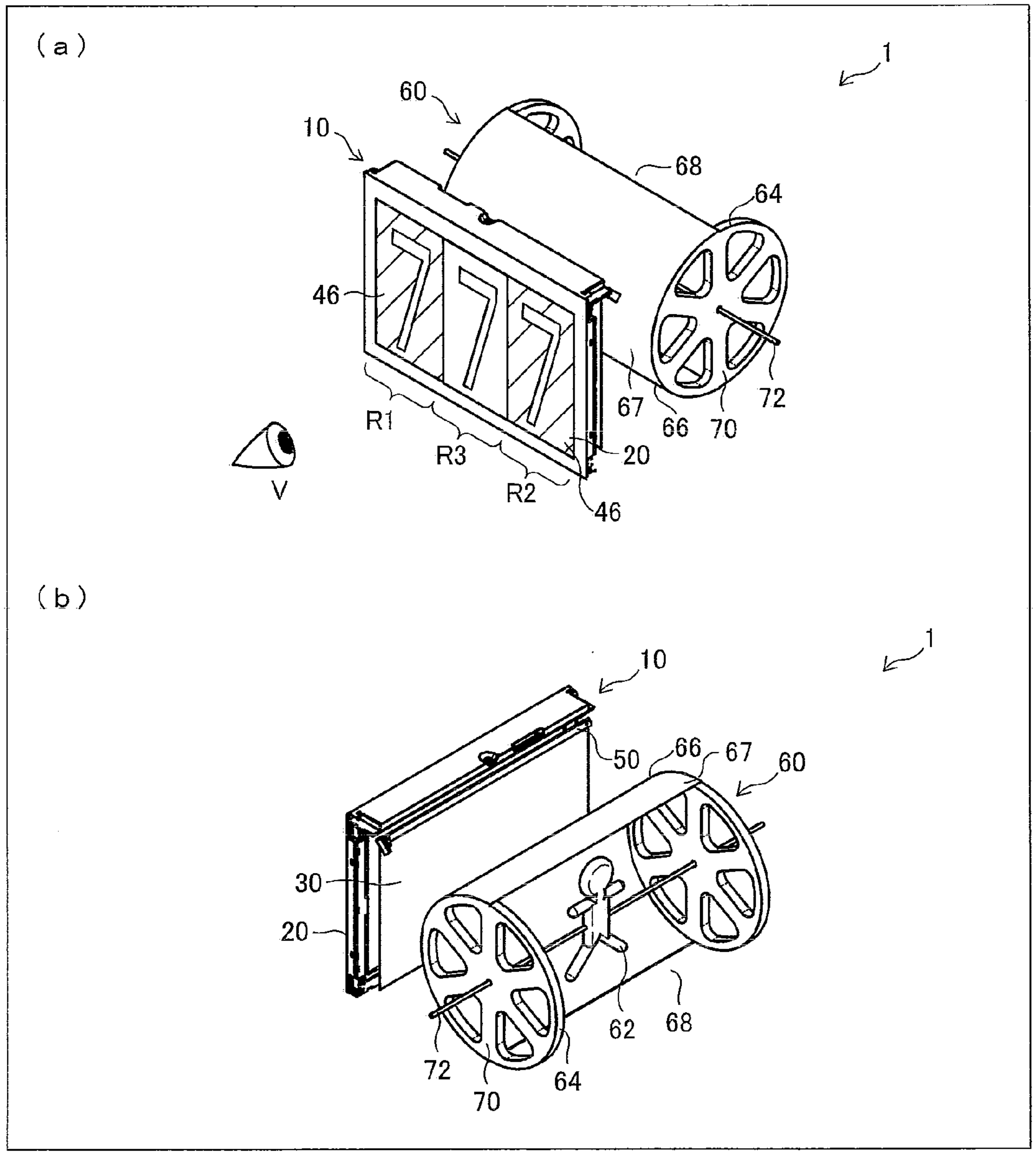
FIG. 1 is a diagram schematically illustrating a configuration of a liquid crystal display unit of an embodiment of the present invention; (a) illustrates the liquid crystal display unit seen from a front oblique direction, and (b) illustrates the liquid crystal display unit seen from a rear oblique direction.

1 liquid crystal display unit
10 liquid crystal display section
20 first liquid crystal display panel
30 second liquid crystal display panel
40 first light source section
42 first light source lamp
44 light guide plate
46 reflective sheet
50 second light source section
52 second light source lamp (light source lamp)
60 character object section
62 character object
64 character object shielding section (shielding device, drum device)
66 display switching section (rotating surface of drum device)
67*a* inner reflecting section
67*b* outer reflecting section
68 transmitting part
90 game device
R1 first display region
R2 second display region
R3 third display region
V viewer
LA light emitted from second light source lamp while no character object is displayed
LB light emitted from second light source lamp while character object is being displayed
L1 light emitted from first light source lamp while character object is being displayed or no character object is displayed
L2 light emitted from first light source lamp while no character object is displayed
L3 light emitted from second light source lamp while no character object is displayed
L4 light emitted from first light source lamp while character object is being displayed
L5 light emitted from second light source lamp while character object is being displayed

DESCRIPTION OF EMBODIMENTS

First Embodiment

One embodiment of the present invention is described below with reference to the attached drawings.

(Configuration of Liquid Crystal Display Unit)

First described is a configuration of a liquid crystal display unit of the present embodiment, with reference to (a) and (b) of FIG. 1. Both (a) and (b) of FIG. 1 are perspective views schematically illustrating a configuration of a liquid crystal display unit 1 of the present embodiment; (a) of FIG. 1 shows a view seen from a front side of the liquid crystal display unit 1, and (b) of FIG. 1 shows a view seen from a rear side of the liquid crystal display unit 1.

As illustrated in (a) of FIG. 1, the liquid crystal display unit 1 of the present embodiment includes a liquid crystal display section 10, a character object section 60, and a main control section (not illustrated).

(Character Object Section)

The character object section 60 includes a character object 62, a character object shielding section 64, and a shielding control section (not illustrated). The character object shielding section 64 includes a display switching section 66, reel sections 70, and a rotating shaft 72.

The character shielding section 64 is provided so as to have a substantially cylindrical shape. In the character shielding section 64, two round surfaces that face each other correspond to the respective reel sections 70, and a side surface (rotating surface) corresponds to the display switching section 66.

The rotating shaft 72 is provided so as to pass through the two reel sections 70 at centers of the respective round reel sections 70 such that the cylinder, i.e. the character object shielding section 64 is rotatable.

(Character Object)

The character object 62 is provided at a substantially middle position of the rotating shaft 72 in a shaft direction of the rotating shaft 72.

The character object 62 is intended to be a figurative object such as a model of a person, character, or vehicle, which is directly shown to a viewer of the liquid crystal display unit 1. In the present embodiment, a doll is used as the character object 62.

The doll, or the character object 62 is provided at a substantially middle position of the cylindrical character object shielding section 64 such that the rotating shaft 72 penetrates through the doll. The doll is of a size that does not interfere with the rotation of the character object shielding section 64. In other words, the doll should be of a size that allows the doll to be kept inside the cylinder during the rotation of the character object shielding section 64.

The doll serving as the character object 62 is provided to the rotating shaft 72 so as to be rotatable about the rotating shaft 72.

Consequently, even if the character object shielding section 64 rotates in response to the rotation of the rotating shaft 72, the doll serving as the character object 62 that is provided inside the character object shielding section 64 does not rotate, and always points one direction determined by its center of gravity.

More specifically, in the present embodiment, the doll always has its feet pointing downwards.

(Display Switching Section)

The following description explains the display switching section 66 in the character object shielding section 64 of the present invention. As described earlier, the display switching section 66 corresponds to the side surface (rotating surface) of the cylindrical character object shielding section 64, and one part of the character object shielding section 64 is opaque and the other part is transparent. More specifically, one half of the region extending in the circumferential direction is an opaque region, and the other half of the region is a transparent region.

Transparent denotes that the character object 62 provided inside the display switching section 66 is visible from outside the display switching section 66, whereas opaque denotes that the character object 62 is invisible from outside the display switching section 66.

(Reflective Section (Non-Transmitting Section))

The following description first explains the reflecting section 67 provided in the display switching section 66, in more details. The reflecting section 67 is provided for preventing the viewer of the display unit 1 from directly seeing the character object 62, in other words the reflecting section 67 is provided for concealing the character object provided in the display switching section 66 from the viewer.

In the present embodiment, the reflecting section 67 is realized by an opaque member different from the transmitting section 68.

More specifically, a plastic sheet (film), having a property of reflecting light from its surface, such as a milk white PET (Polyethylene Terephthalate) sheet, is used as the opaque member.

A material constituting the reflecting section 67 is not particularly limited, and for example another organic material or a metal material can also be used.

Use of a metal material allows an improvement in at least strength, durability, and thermal stability of the character object shielding section 64.

The material may also be composite material of organic material and metal material, for example a material in which a sheet made of organic material coated with a metal material.

The reflection from the surface of the reflecting section 67 can be realized by various reflections such as internal scattering caused by the material itself whose color is milky white, external (surface) scattering caused by scatter reflection due to an unleveled surface, or direct reflection.

Further, as illustrated in (a) of FIG. 1 and the like, the reflecting section 67 is one part of the display switching section 66 corresponding to the side surface of the cylinder, and the reflecting section 67 has (i) an inner reflecting section 67*a* that is the inner side surface of the cylinder and (ii) an outer reflecting section 67*b* which is the outer side surface of the cylinder.

The reflection from the surface is preferably attained from both the inner reflecting section 67*a* and the outer reflecting section 67*b*, and is particularly preferable to attain sufficient reflection from the outer reflecting section 67*b*. Functions of the inner reflecting section 67*a* and the outer reflecting section 67*b* are later described.

(Transmitting Part)

The following describes the transmitting part 68 inside the display switching section 66. The transmitting part 68 is provided for allowing the viewer of the liquid crystal display unit 1 to directly see the character object 62, in other words, the transmitting part 68 is provided for making the character object 62 visible in the display switching section 66.

In view of this, the present embodiment employs a plastic sheet (film) which has a light-transmitting property, for example a transparent PET sheet is used as the transmissive sheet.

Members that constitute the transmitting part 68 are not particularly limited, and another organic material or an inorganic material such as glass may be used for example.

Moreover, the transmitting part 68 does not necessarily need to be realized by providing the members as described above. The transmitting part 68 can just be an opening, instead of providing any members.

(Integral Configuration)

In a case where the reflecting section 67 is made from a milky white PET sheet and the transmitting part 68 is made from a transparent PET sheet, the display switching section 66 including the reflecting section 67 and transmitting part 68, ultimately the character object shielding section 64, can be realized by combining the milky white PET sheet and the transparent PET sheet so that the two sheets form a cylinder.

With this method, it is possible to easily form the display switching section 66.

(Entire Configuration of Liquid Crystal Display Section)

Figure 5:
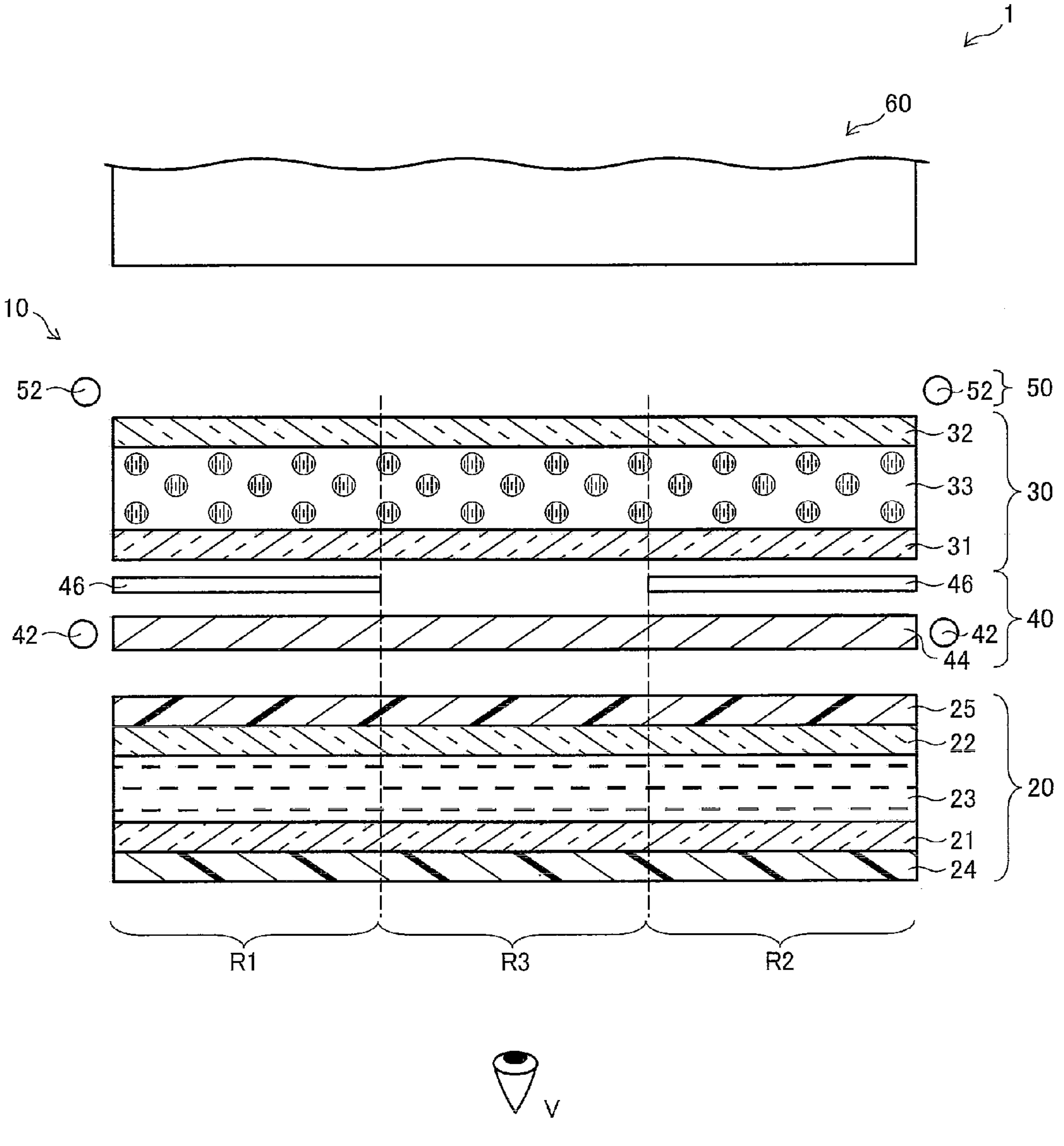
FIG. 5 is a cross-sectional view schematically illustrating a configuration of a liquid crystal display section in a liquid crystal display unit of the present invention.

The following description explains the liquid crystal display section 10 of the present embodiment, with reference to (a) and (b) of FIG. 1, and FIG. 5. FIG. 5 is a cross-sectional view schematically illustrating a configuration of the liquid crystal display section 10 in the liquid crystal display unit 1 of the present embodiment.

The liquid crystal display section 10 of the present embodiment includes two liquid crystal display panels (liquid crystal display elements), i.e. a first liquid crystal display panel 20 and a second liquid crystal display panel 30. The first liquid crystal display panel 20 and the second liquid crystal display panel 30 are combined such that a first light source section 40 is sandwiched between the two liquid crystal display panels 20 and 30. The first liquid crystal display panel 20 is disposed so as to be closer to a viewer of the liquid crystal display unit 1 (see viewer V in FIG. 5), whereas the second liquid crystal display panel 30 is disposed so as to be closer to the character object section 60.

Further, a second light source section 50 is provided between the second liquid crystal display panel 30 and the character object section 60.

The following descriptions describe each of the members.

(First Liquid Crystal Display Panel)

The first liquid crystal display panel 20 is configured by a regular liquid crystal display panel, for example an active matrix liquid crystal display panel that includes pixels having respective TFTs (thin film transistors).

The first liquid crystal display panel 20 has a schematic layer configuration in which (i) a liquid crystal layer 23 is provided between two substrates (first substrate 21 and second substrate 22) and (ii) a first polarizing plate 24 and a second polarizing plate 25 are provided on surfaces (outer surfaces) of the respective two substrates which surfaces do not face the liquid crystal layer 23.

The first liquid crystal display panel 20 displays an image, indicating game details or the like, which is shown to a viewer V of the liquid crystal display unit 1 (for example, if the liquid crystal display unit 1 is for use in a game device, the viewer V will be the game player of the game device).

(First Light Source Section)

The first light source section 40 mainly functions as a backlight of the first liquid crystal display panel 20.

The first light source section 40 mainly includes a light guide plate 44 of a substantially same size as the first liquid crystal display panel 20, two first light source lamps 42, and a reflective sheet 46. The two first light source lamps 42 are disposed at both ends of each of the liquid crystal display unit 1 and the light guide plate 44 (side light method), and the reflective sheet 46 is disposed between the light guide plate 44 and the second liquid crystal display panel 30.

Each of the light guide plate 44 and the reflective sheet 46 is not disposed on the entire display surface of the first liquid crystal display panel 20, but is disposed on two regions that correspond to both ends of the display surface out of three regions obtained by assuming that the display surface is longitudinally divided into the three sections. That is to say, in FIG. 5, in a case where it is assumed that the display surface of the first liquid crystal display panel 20 is divided into three regions (see dotted lines in FIG. 5), each of the light guide plate 44 and reflective sheet 46 is provided in a first display region R1 and a second display region R2 between which a third region R3 is provided. However, neither the light guide plate 44 nor the reflective sheet 46 is provided in the third display region R3 (see FIG. 5).

Note that the first liquid crystal display panel 20 and the first light source section 40 can be integrally formed to be a single module, i.e., for example a first liquid crystal module 18, for example by forming the first liquid crystal display panel 20 and the first light source section 40 in a single frame (see FIG. 6 later described).

(Second Liquid Crystal Display Panel)

The following description explains the second liquid crystal display panel 30.

The second liquid crystal display panel 30 in the present embodiment is realized by what is called a polymer-dispersed type liquid crystal display panel.

More specifically, a liquid crystal layer 33 is provided between two substrates (first substrate 31 and second substrate 32). This liquid crystal layer 33 is a liquid crystal layer of a polymer-dispersed type. The liquid crystal layer 33 has a three-dimensional network caused by the polymer, and liquid crystal molecules are introduced in spaces in the network.

Note that the second liquid crystal display panel 30 includes no polarizing plate.

(1) Light Scattering State

As described earlier, according to the polymer-dispersed second liquid crystal display panel 30, the liquid crystal molecules are randomly aligned while no voltage is applied to the liquid crystal layer 33. This causes light to scatter in the liquid crystal layer 33.

Therefore, while no voltage is applied, it is difficult for light to transmit through the liquid crystal layer 33, thereby causing the amount of reflected light to increase. The light that has transmitted through the liquid crystal layer 33 also becomes white scattering light, since the transmitted light scatters in the liquid crystal layer 33.

Therefore, while no voltage is applied to the liquid crystal layer 33, an object behind the liquid crystal display panel 30 (e.g., the character object 62) is invisible, or is only visible in a whitish and blurred state.

(2) Transparent State

On the other hand, while a voltage is being applied to the liquid crystal layer 33, the liquid crystal molecules align in a single direction in accordance with an electric field generated by the voltage. That is to say, the alignment state changes from a randomly aligned state to a uniformly aligned state.

Therefore, light transmits through the liquid crystal layer 33, instead of scattering in the liquid crystal layer 33.

This causes the second liquid crystal display panel 30 to be transparent, and therefore allows a clear vision of the object (for example character object 62) behind the second liquid crystal display panel 30.

(Second Light Source Section)

The following description explains the second light source section in the present embodiment.

As shown in FIG. 5, the second light source section 50 is disposed between the second liquid crystal display panel 30 and the character object section 60. The second light source section 50 mainly includes a pair of second light source lamps 52 disposed on either side of the second liquid crystal display panel 30.

(Mechanism of Display)

Figure 2:
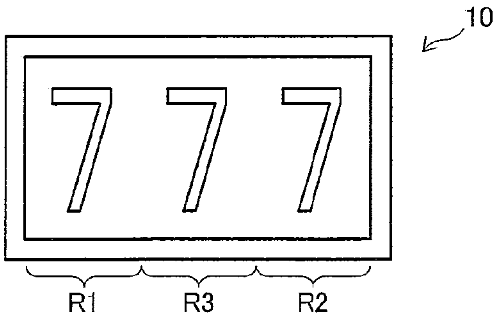
FIG. 2 is a diagram illustrating what is visible, on the liquid crystal display unit illustrated in FIG. 1, from a viewer of the liquid crystal display unit.
Figure 3:
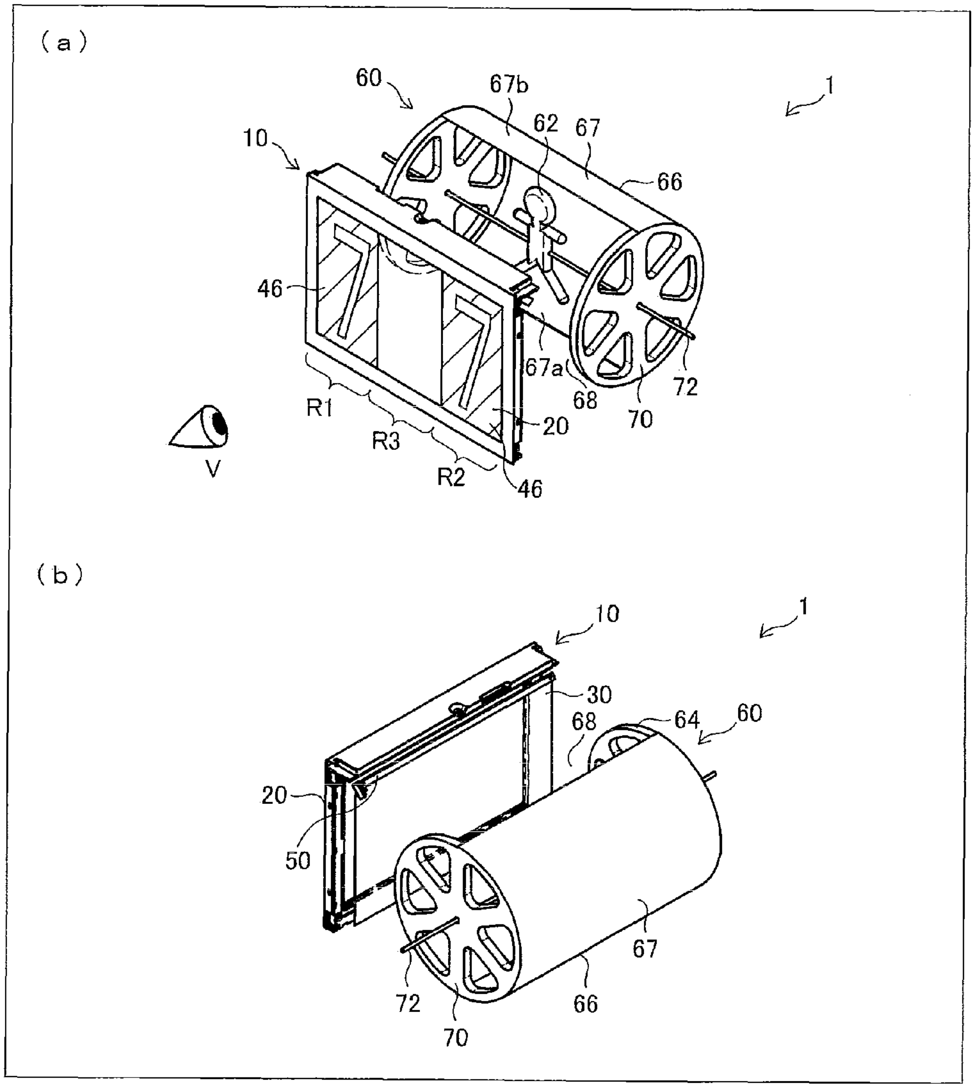
FIG. 3 is a diagram schematically illustrating a configuration of a liquid crystal display unit of an embodiment of the present invention; (a) illustrates the liquid crystal display unit seen from a front oblique direction, and (b) illustrates the liquid crystal display unit seen from a rear oblique direction.
Figure 4:
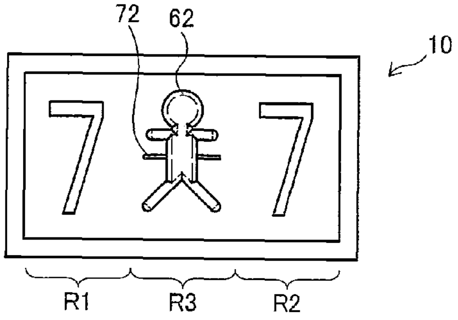
FIG. 4 is a diagram illustrating what is visible, on the liquid crystal display unit illustrated in FIG. 3, from a viewer of the liquid crystal display unit.

The following description explains a mechanism of display in the display unit 1 of the present embodiment, with reference to (a) and (b) of FIG. 1, FIG. 2, (a) and (b) of FIG. 3, and FIG. 4.

(While No Character Object is Displayed)

In FIG. 1, (a) and (b) are perspective views schematically illustrating the liquid crystal display unit 1. Both (a) and (b)

illustrate a state in which the character object 62 is not displayed and is invisible from a viewer of the liquid crystal display unit 1. FIG. 2 illustrates what is visible, on the liquid crystal display section 10, from a viewer V of the liquid crystal display unit 1 while no character object is displayed.

(1) First Liquid Crystal Display Panel 20

While the character object 62 is being shielded from the viewer V and is not displayed, the first liquid crystal display panel displays, on its front surface, what should be displayed to the viewer V. In the example shown in FIG. 2, the first liquid crystal display panel 20 displays "777".

(2) First Light Source 40

While no character object is displayed, the two first light source lamps 42 of the first light source section 40 are lit, and function as a backlight of the first liquid crystal display panel 20, via the light guide plate 44 and the reflective sheet 46.

(3) Second Liquid Crystal Display Panel 30

While no character object is displayed, no voltage is applied to the liquid crystal layer 33 of the polymer-dispersing second liquid crystal display panel 30. Therefore, the second liquid crystal display panel 30 is in the light-scattering state.

(4) Second Light Source Section 50

While no character object is displayed, the second light source lamps 52 of the second light source section 50 are lit.

Note that the second light source lamps 52 of the second light source sections 50 are not necessarily lit while no character object is displayed. This is because there is no need to light the character object 62.

However, the second light source lamps 52 also function as a backlight of the first liquid crystal display panel 20. Particularly, the second light source lamps 52 are useful as a backlight for the third display region R3 (light for illuminating the third display region R3) where no reflective sheet 46 is provided. Therefore, it is preferable to light the second light source lamp 52 even while no character object is displayed. Details of this are described later.

(5) Character Object Shielding Section 64

While no character object is displayed, the character object shielding section 64 rotates so that the reflecting section 67 of the display switching section 66 faces the liquid crystal display section 10.

This is to shield the character object 62.

(View from Viewer V)

While each of the sections of the liquid crystal display unit 1 are being maintained in the above respective states, the display of "777" is visible from the viewer V as shown in FIG. 2, whereas the character object 62 is invisible from the viewer V. This is described below.

While no character object is displayed, the second liquid crystal display panel 30 is in a light-scattering state as described above. As such, it is difficult for the viewer V to see behind the second liquid crystal display panel 30.

Further, according to the liquid crystal display unit 1 of the present embodiment, the character object shielding section 64 rotates so that the reflecting section 67 of the display switching section 66 faces the liquid crystal display section 10.

Therefore, the character object 62 is more completely concealed from the viewer V, as compared to a case where the character object is shielded just by the second liquid crystal display panel 30.

As a result, the viewer V cannot see the character object 62, but can see what is displayed on the first liquid crystal display element, i.e., just the "777".

(While Character Object is Displayed)

The following description explains the states obtained while the character object is being displayed.

In FIG. 3, (a) and (b) are perspective views schematically illustrating a configuration of the liquid crystal display unit 1, which is similar to (a) and (b) of FIG. 1. Note however that (a) and (b) of FIG. 3 illustrate a state shown while the character object 62 is being displayed and is being visible from a viewer of the liquid crystal display unit 1. FIG. 4 illustrates what is visible, on the liquid crystal display section 10, from the viewer V of the liquid crystal display unit 1 of the present embodiment while the character object is being displayed.

(1) First Liquid Crystal Display Panel 20

While the character object 62 is being displayed and is being visible from the viewer V, the first liquid crystal display panel 20 displays, on its front surface, what should be shown to the viewer V. In the example shown in FIG. 2, "7" is displayed not on the entire first liquid crystal display panel 20 but on each of the first display region R1 and the second display region R2 which correspond to respective regions where the reflective sheet 46 is provided. Nothing is displayed on the third display region R3 corresponding to the region where no reflective sheet 46 is provided.

(2) First Light Source Section 40

While the character object is being displayed, the two first light source lamps 42 of the first light source section 40 are lit, which is similar to a case where no character object is displayed, and function as a backlight of the first liquid crystal display panel 20 via the light guide plate 44 and the reflective sheet 46.

(3) Second Liquid Crystal Display Panel 30

While the character object is being displayed, a voltage is being applied to the liquid crystal layer 33 of in the polymer-dispersed second liquid crystal display panel 30. This causes the second liquid crystal display panel 30 to be in a light transmitting state.

A voltage applied to the liquid crystal layer 33 of the second liquid crystal display panel 30 can be applied to the entire second liquid crystal display panel 30. However, the voltage can be alternatively applied, for example, to just the liquid crystal layer 33 of the third display region R3 corresponding to the region in which no reflective sheet 46 is provided.

In a case where just the necessary regions are made transparent to display the character object 62, it is possible to show the character object 62 brighter and clearer while the character object 62 is being displayed. Specific descriptions will be provided later.

(4) Second Light Source Section 50

While the character object is being displayed, the second light source lamps 52 of the second light source section 50 are lit. Note that the second light source lamps 52 of the second light source section 50 are lit to illuminate the character object 62, unlike while no character object is displayed.

(5) Character Object Shielding Section 64

While the character object is being displayed, the character object shielding section 64 rotates such that the transmitting part 68 of the display switching section 66 faces the liquid crystal display section 10.

This is to release the character object 62 from the shielded state.

(View from Viewer V)

While each of the sections of the liquid crystal display unit 1 are being maintained in the above respective states, the display of "7 (character object) 7" is visible from the viewer V, as illustrated in FIG. 4. Descriptions of this are described below.

While the character object is being displayed, the third display region R3 of the second liquid crystal display panel 30, in which the character object 62 is disposed and has no reflective sheet 46 as described above, is in a light transmitting state. Therefore, the viewer V can see the character object 62 disposed behind the second liquid crystal display panel 30 in the third display region R3.

Furthermore, according to the liquid crystal display unit 1 of the present embodiment, the character object shielding section 64 rotates so that the transmitting part 68 of the display switching section 66 faces the liquid crystal display section 10.

Therefore, the character object 62 is not shielded and is visible from the viewer.

As a result, the viewer V can see what is displayed on the first liquid crystal display panel 20, i.e., the display of "7" and "7", and also the character object 62 between the "7" and "7".

(Second Light Source Section)

Figure 8:
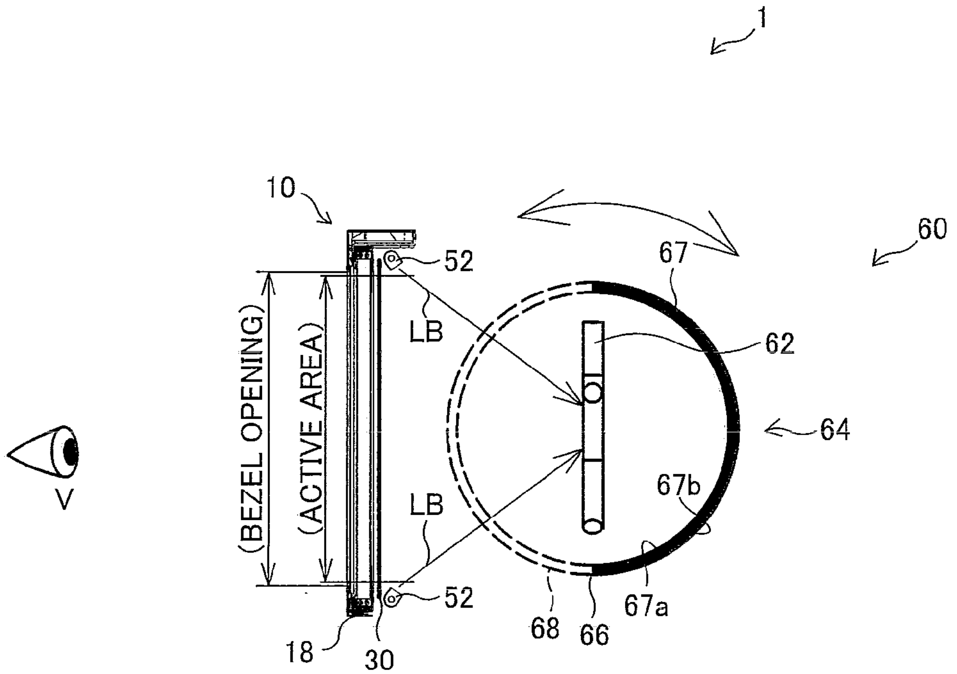

The following description explains the mechanism of display and non-display of the character object 62, and an operation of the second light source lamps 52 provided in the second light source section 50, with reference to a view illustrating a state where the liquid crystal display unit 1 is transversely seen. FIGS. 6 and 8 are diagrams schematically illustrating respective cases where the liquid crystal display unit 1 of the present embodiment is transversely seen. FIG. 6 illustrates a state shown while no character object is displayed, whereas FIG. 8 illustrates a state shown while the character object is being displayed.

Figure 6:
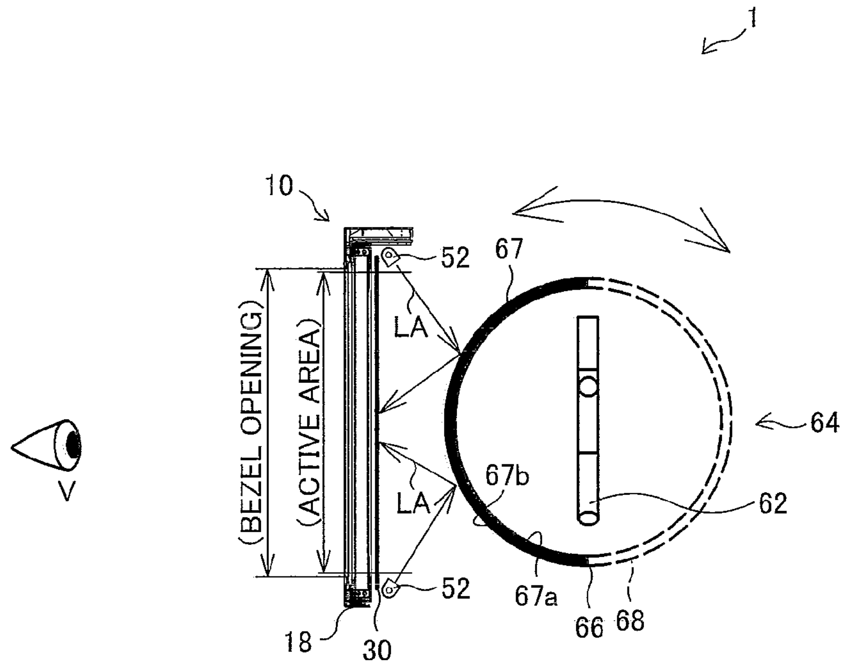
FIG. 6 is a diagram schematically illustrating a configuration of a liquid crystal display unit of an embodiment of the present invention, and illustrates a liquid crystal display unit seen from a side direction while no character object is displayed.
Figure 7:
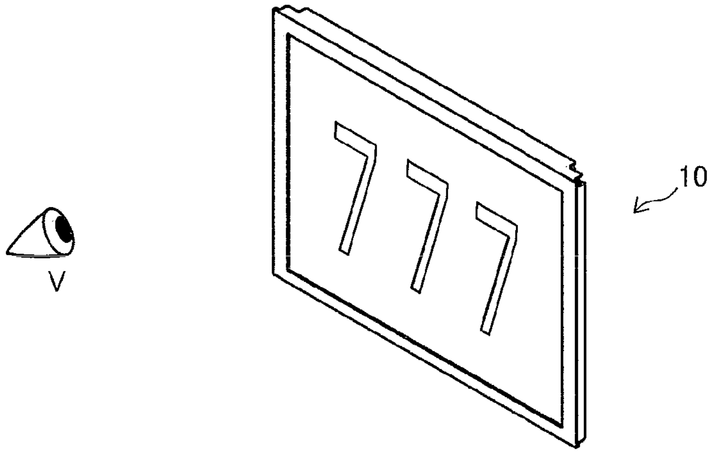
FIG. 7 is a diagram illustrating what is visible, on the liquid crystal display unit illustrated in FIG. 6, from a viewer of the liquid crystal display unit FIG. 8 schematically illustrates a configuration of a liquid crystal display unit of an embodiment of the present invention, and is a view seen from a side direction of the liquid crystal display unit while a character object is being displayed.
Figure 9:
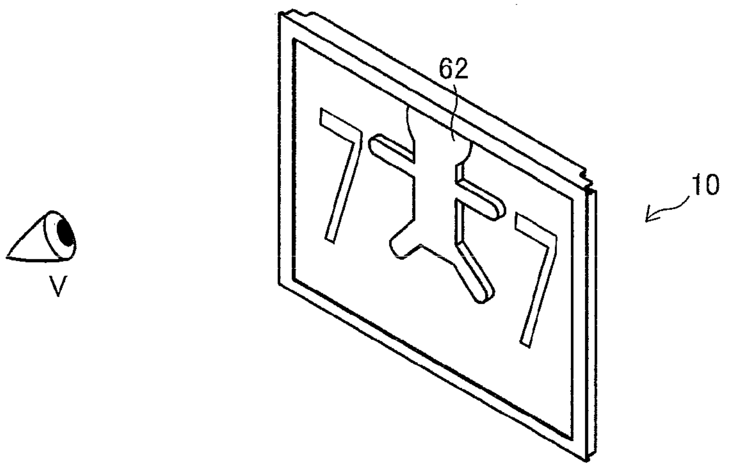
FIG. 9 is a diagram illustrating what is shown on the liquid crystal display unit illustrated in FIG. 8 to a viewer of the liquid crystal display unit.

Furthermore, FIGS. 7 and 9 are diagrams illustrating what are visible, on the liquid crystal display section 10, from the viewer V of the liquid crystal display unit 1 illustrated in FIGS. 6 and 8, respectively.

(While No Character Object is Displayed)

The first description explains a case where no character object is displayed.

As shown in FIG. 6, the display unit 1 of the present embodiment includes a reflecting section 67, disposed between the viewer V and the character object (display object) 62, which serves as physical (mechanical, not by the liquid crystal display device) shielding means. Therefore, the character object 62 is sufficiently shielded from the viewer V.

As a result, the viewer V can see just what is displayed on the first liquid crystal display panel 20 of the first liquid crystal module 18 ("777") as illustrated in FIG. 7, instead of seeing the character object 62.

While no character object is displayed, the viewer V can see what is displayed on the first liquid crystal display panel 20 as illustrated in FIG. 7 more brightly and clearly, by lighting the second light source lamps 52 of the second light source section 50.

That is to say, as shown by arrow LA in FIG. 6, light, emitted from the second light source lamps 52 while no character object is displayed, is shielded by the reflecting section 67 of the display switching section 66. More specifically, the light emitted from the second light source lamps 52 is reflected from an outer reflecting section 67*b* of the reflecting section 67, is then transmitted through the first liquid crystal display panel 20 of the first liquid crystal module 18, and ultimately reaches the viewer V.

In other words, the light emitted from the second light source lamps 52 serves as a backlight of the first liquid crystal display panel 20. This allows the viewer V to see what is displayed on the first liquid crystal display panel 20 more brightly and clearly.

(While Character Object is Being Displayed)

The following description explains the states obtained while the character object is being displayed.

As illustrated in FIG. 8, according to the display unit 1 of the present embodiment, the reflecting section 67 located between the viewer V and the character object (display object) 62 is taken away due to the rotation of the display switching section 66, and instead the transmitting part 68 is located between the viewer V and the character object 62.

The transmitting part 68 has optical transparency, as described earlier. Thus, the viewer V can directly see the character object 62, instead of being shielded.

As a result, the viewer V can see the character object 62 in a center portion sandwiched between the "7" and "7" that are displayed on the first liquid crystal display panel 20 of the first liquid crystal module 18 (see FIG. 9).

While the character object is being displayed, the second light source lamps 52 of the second light source section 50 are lit. This allows the viewer V to see what is displayed as illustrated in FIG. 9, particularly the character object 62, more brightly and clearly.

That is to say, as shown in arrow LB in FIG. 8, light, emitted from the second light source lamps 52 while the character object is displayed, is radiated to the character object 62, different from while no character object is displayed.

Moreover, light that is not directly radiated to the character object 62 sometimes contributes to illumination of the character object 62 after the light is reflected from a surface of the inner reflecting section 67*a* of the reflecting section 67.

Furthermore, there may be cases where the light thus reflected transmits through the first liquid crystal display panel 20 and then reaches eyes of the viewer V. Namely, there may be cases where the reflected light serves as a backlight of the first liquid crystal display panel 20.

The light emitted from the second light source lamps 52 directly and indirectly illuminates the character object 62. This allows the viewer V to see the character object more brightly and clearly. Moreover, the viewer V can also see more brightly and clearly what is displayed on the first liquid crystal display panel 20 but displayed on either side of the character object 62.

As described above, in order for the viewer V to more brightly and clearly see what is displayed on the first liquid crystal display panel 20 and the character object 62, each of the inner reflecting section 67*a* and the outer reflecting section 67*b* of the reflecting section 67 preferably has a high reflection performance (reflectance). Moreover, it is preferable that the reflection is diffuse reflection than direct reflection, in view of at least glare prevention.

(Shape of Reflective Sheet)

In the foregoing description, the reflective sheet 46 disposed in the first light source section 40 is disposed on both sides of a display surface (active area) of the liquid crystal display section 10, as illustrated in (a) of FIG. 1 for example.

Figure 10:
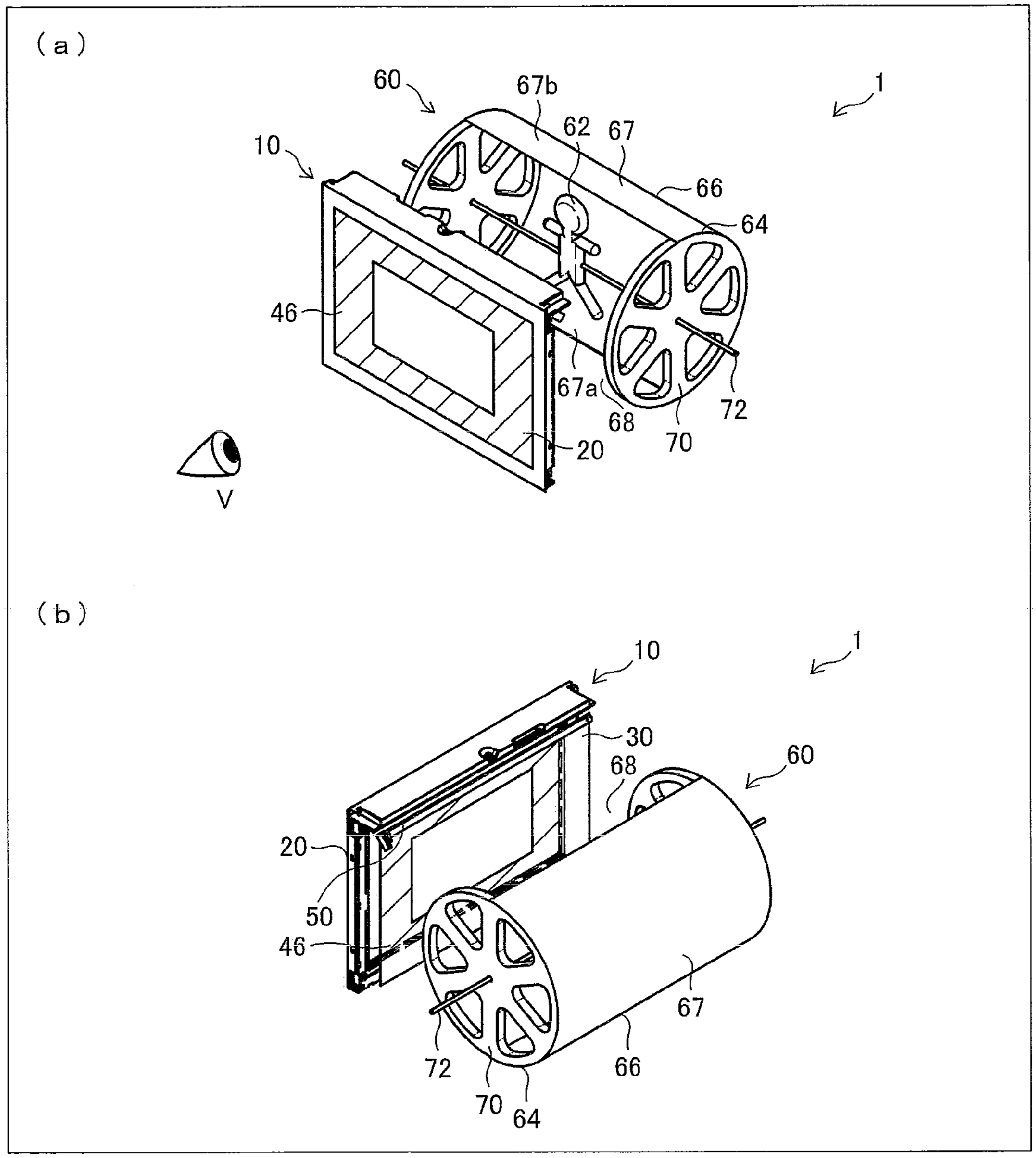
FIG. 10 is a diagram schematically illustrating a configuration of a liquid crystal display unit of an embodiment of the present invention; (a) illustrates the liquid crystal display unit seen from a front oblique direction, and (b) illustrates the liquid crystal display unit seen from a rear oblique direction.

The reflective sheet 46 is not particularly limited in its shape, and can have a shape of a frame on the display surface as illustrated in (a) and (b) of FIG. 10, which illustrate another configuration of the liquid crystal display unit 1 of the present embodiment.

Figure 11:
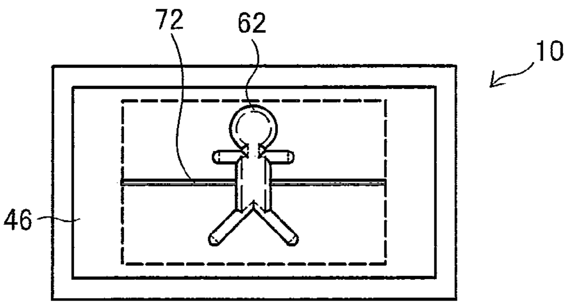
FIG. 11 is a diagram illustrating what is shown on the liquid crystal display unit illustrated in FIG. 10 to a viewer of the liquid crystal display unit.

In a case where the reflective sheet 46 has a shape of a frame, the viewer V sees the liquid crystal display unit 1 as shown in FIG. 11.

That is to say, the viewer V can see the character object 62 on the display surface but inside the frame part which corresponds to a region in which the reflective sheet 46 is formed.

(Light of Light Source Lamp)

The following description explains the light emitted from each of the first light source section 40 and the second light source section 50 (first light source lamps 42 and second light source lamps 52) in further detail, with reference to cross-sectional views of the liquid crystal display unit 1.

Figure 12:
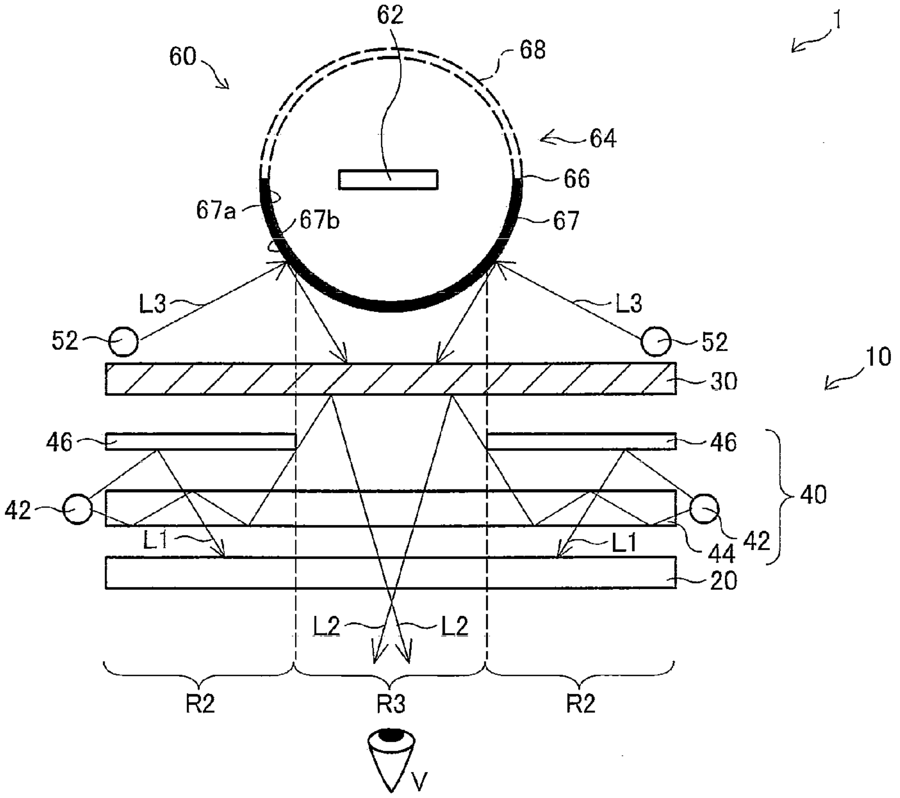
FIG. 12 schematically illustrates a configuration of a liquid crystal display unit of an embodiment of the present invention, and is a cross-sectional view of a liquid crystal display unit while no character object is displayed.
Figure 13:
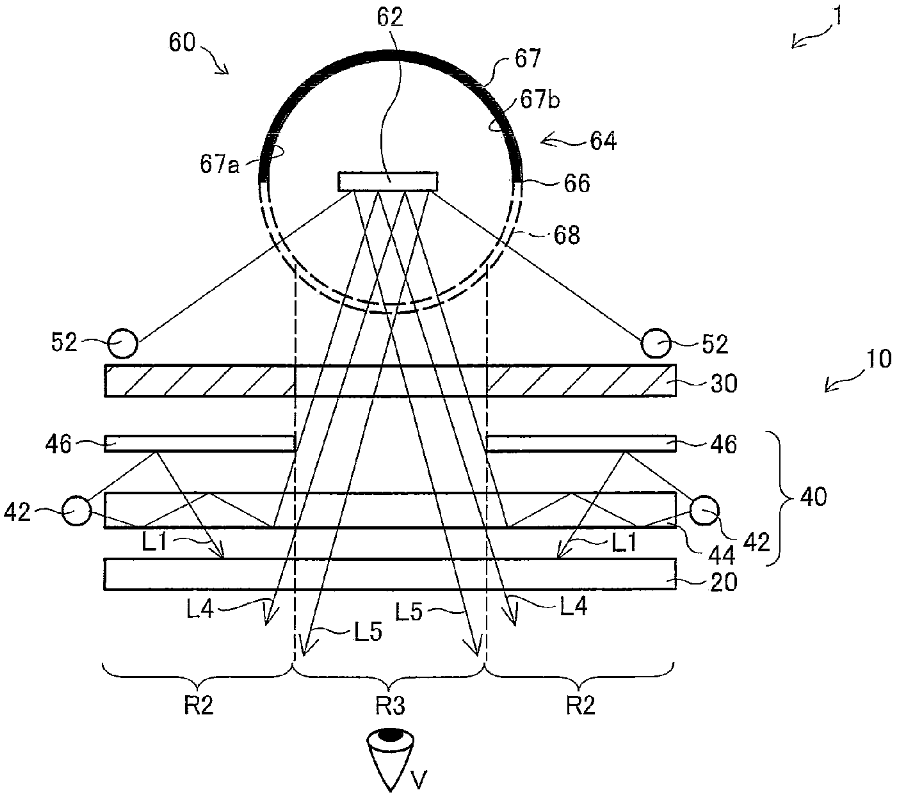
FIG. 13 schematically illustrates a configuration of a liquid crystal display unit of an embodiment of the present invention, and is a cross-sectional view of a liquid crystal display unit while a character object is being displayed.

FIGS. 12 and 13 are diagrams schematically illustrating a longitudinal cross-section at a mid position of the display surface of the liquid crystal display unit 1 illustrated in (a) and (b) of FIG. 10. FIG. 12 illustrates the liquid crystal display unit 1 shown while no character object is displayed, whereas FIG. 13 illustrates the liquid crystal display unit 1 shown while the character object is being displayed.

(While No Character Object is Displayed)

(1) First Light Source Lamps 42 (First Light Source Section 40)

While no character object is displayed, the light emitted from the first light source lamps 42 of the first light source section 40 are mainly divided, as shown by arrows L1 and L2 in FIG. 12, into (a) light that is reflected from the reflective sheet 46 behind the light guide plate 44 (arrow L1), which light is not directly entered in the light guide plate 44 adjacent to the first light source lamps 42 or is not traveled up to the center region of the display surface even if the light enters the light guide plate 44, and (b) light that is propagated in the light guide plate 44 and is directed toward the center of the display surface (arrow L2).

More specifically, the light shown by the arrow L1 is reflected from the surface of the reflective sheet 46, is then transmitted through the first liquid crystal display panel 20, and thereafter is emitted out to the direction of the viewer V. With the liquid crystal display unit 1 of the present embodiment, the reflective sheet 46 is not provided to the entire display surface. Therefore, the light shown by the arrow L1 is mainly emitted from the first display region R1 and second display region R2 that are portions (both end portions) in which the reflective sheet 46 is provided.

On the other hand, the light shown by the arrow L2 propagates in the light guide plate 44 and is directed toward the center of the display surface, and reaches the second liquid crystal display panel 30 in the third display region R3 via a section in which the reflective sheet 46 is not provided. Note that the third display region 3 is a portion (center portion) in which the reflective sheet 46 is not provided, and that the second liquid crystal display panel 30 is disposed behind the reflective sheet 46.

As described above, in the second liquid crystal display panel 30, while no character object is displayed, no voltage is applied to the liquid crystal layer 33 of the second liquid crystal display panel 30. Therefore, the second liquid crystal display panel 30 is in a light-scattering state. Hence, light that reaches the second liquid crystal display panel 30 is reflected from a surface of the second liquid crystal panel 30 and is emitted towards the viewer V or alternatively, the light that reaches the second liquid crystal display panel 30 scatters inside the second liquid crystal display panel 30, which brightens the second liquid crystal display panel 30 itself.

Thus, the light shown by arrow L2 functions as a backlight of the third display region R3 in the display surface.

From the above, in the first display region R1 and second display region R2 which are end regions of the display surface, the light shown by the arrow L1 mainly functions as the backlight, and in the third display region R3 which is the center region in the display surface, the light shown by the arrow L2 mainly functions as the backlight.

As a result, it is possible to attain a bright display for the entire display surface.

(2) Second Light Source Lamps 52 (Second Light Source Section 50)

The following describes light emitted from the second light source lamps 52 of the second light source section 50, while no character object is displayed.

As shown by arrow L3 in FIG. 12, light emitted from the second light source lamps 52 is reflected from an outer reflecting section 67*b* in the reflecting section 67 of the display switching section 66. The light thus reflected from the outer reflecting section 67*b* reaches the second liquid crystal display panel 30.

As described above, in the second liquid crystal display panel 30, while no character object is displayed, no voltage is applied to the liquid crystal layer 33 of the second liquid crystal display panel 30. Therefore, the second liquid crystal display panel 30 is in a light-scattering state. Hence, light that reaches the second liquid crystal display panel 30 is reflected from the surface of the second liquid crystal panel 30 and repeats reflection between the outer reflecting section 67*b* and the second liquid crystal display panel 30. Alternatively, the light that reaches the second liquid crystal display panel 30 scatters inside the second liquid crystal display 30, which brightens the second liquid crystal display panel 30 itself.

This brightened second liquid crystal display panel 30, as described above, functions as the backlight of the first liquid crystal display panel 30.

In the present embodiment, the character object shielding section 64 of the character object section 60 is formed to have a cylindrical shape. Therefore, while no character object is displayed as in FIG. 12, the reflecting section 67 of the display switching section 66 draws close to the liquid crystal display section 10 in the third display region R3. As a result, the light emitted from the second light source lamps 52 are more easily emitted to the third display region R3 than the other regions.

This further improves the brightness of the third display region R3 which tends to become relatively darker than the first display region R1 and the second display region R2, caused by insufficient emission of the light shown by the arrow L1 to the third display region.

(While Character Object is Being Displayed)

The following description explains light emitted while the character object is being displayed, with reference to FIG. 13.

(1) First Light Source Lamps 42 (First Light Source Section 40)

Similarly to the foregoing description of while no character object is displayed, while the character object is being displayed, the light emitted from the first light source lamps 42 of the first light source section 40 are mainly divided, as shown by arrows L1 and L4 in FIG. 13, into (a) light that is reflected from the reflective sheet 46 behind the light guide plate 44 (arrow L1), which light is not directly entered to the light guide plate 44 disposed adjacent to the first light source lamps 42 or is not traveled up to the center region of the display surface even if the light enters the light guide plate 44, and (b) light that is propagated in the light guide plate 44 and is directed toward the center of the display surface (arrow L4).

The light shown by the arrow L1 operates as similar to the foregoing description of while no character object is displayed. That is to say, the light shown by the arrow L1 is first reflected from the surface of the reflective sheet 46, is then transmitted through the first liquid crystal display panel 20, and thereafter is emitted out toward the viewer V. More specifically, the light shown by the arrow L1 is mainly emitted from the first display region R1 and second display region R2 that are portions (both end portions) in which the reflective sheet 46 is provided.

On the other hand, the light shown by the arrow L4 propagates in the light guide plate 44 and is directed toward a center of the display surface, as similar to the light shown by the arrow L2 while no character object is displayed. The light further passes through the third display region R3 in which the reflective sheet 46 is not provided (center part), so as to reach the second liquid crystal display panel 30 that is disposed behind the reflective sheet 46.

As described above, in the second liquid crystal display panel 30, a voltage is applied to the liquid crystal layer 33 of the second liquid crystal display panel 30, while the character object is being displayed. Therefore, the liquid crystal layer 33 is in a light-transmitting state. Hence, light that reaches the second liquid crystal display panel 30 is transmitted through the second liquid crystal display panel 30 and reaches the character object section 60. More specifically, the light shown by the arrow L4, after transmitting through the second liquid crystal display panel 30, reaches the character object 62 and illuminates the character object 62.

Hence, the viewer V can recognize the presence of the character object 62.

The light emitted from the first light source lamps 42 which does not reach the character object 62 after being transmitted through the second liquid crystal display panel 30 is reflected from a surface of the inner reflecting section 67*a* of the reflecting section 67. The reflecting section 67 of the present embodiment has a cross-section shaped of an arc (semicircle). Thus, light is made easily emitted toward the viewer V, by reflecting the light from the inner reflecting section 67*a*, an inner side of the reflecting section 67. The light functions as a backlight of the first liquid crystal display panel 20, and thus improves display brightness and uniformity of the brightness in regions or the like in which not much light shown by the arrow L4 is reached.

(2) Second Light Source Lamps 52 (Second Light Source Section 50)

The following description explains light emitted from the second light source lamps 52 of the second light source section 50, while the character object is being displayed.

As shown by arrow L5 in FIG. 13, light emitted from the second light source lamps 52 reach the character object 62 by transmitting through the transmitting part 68 of the display switching section 66, so as to illuminate the character object 62.

Therefore, the viewer V can recognize the presence of the character object 62 more brightly and clearly than a case where just the first light source lamps 42 of the first light source 40 are provided.

Light that does not reach the character object 62 among the light emitted from the second light source lamps 52 is reflected from the surface of the inner reflecting section 67*a* of the reflecting section 67. The reflecting section 67 of the present embodiment has a cross-section shaped of an arc (semicircle). Thus, the light is easily emitted towards the viewer V by the light reflected from the inner reflecting section 67*a*.

This light functions as a backlight of the first liquid crystal display panel 20, as similar to the light reflected from the inner reflecting section 67*a* among the light emitted from the foregoing first light source lamps 42, and improves brightness in display and also uniformity of the brightness.

(Entire Configuration)

Figure 14:
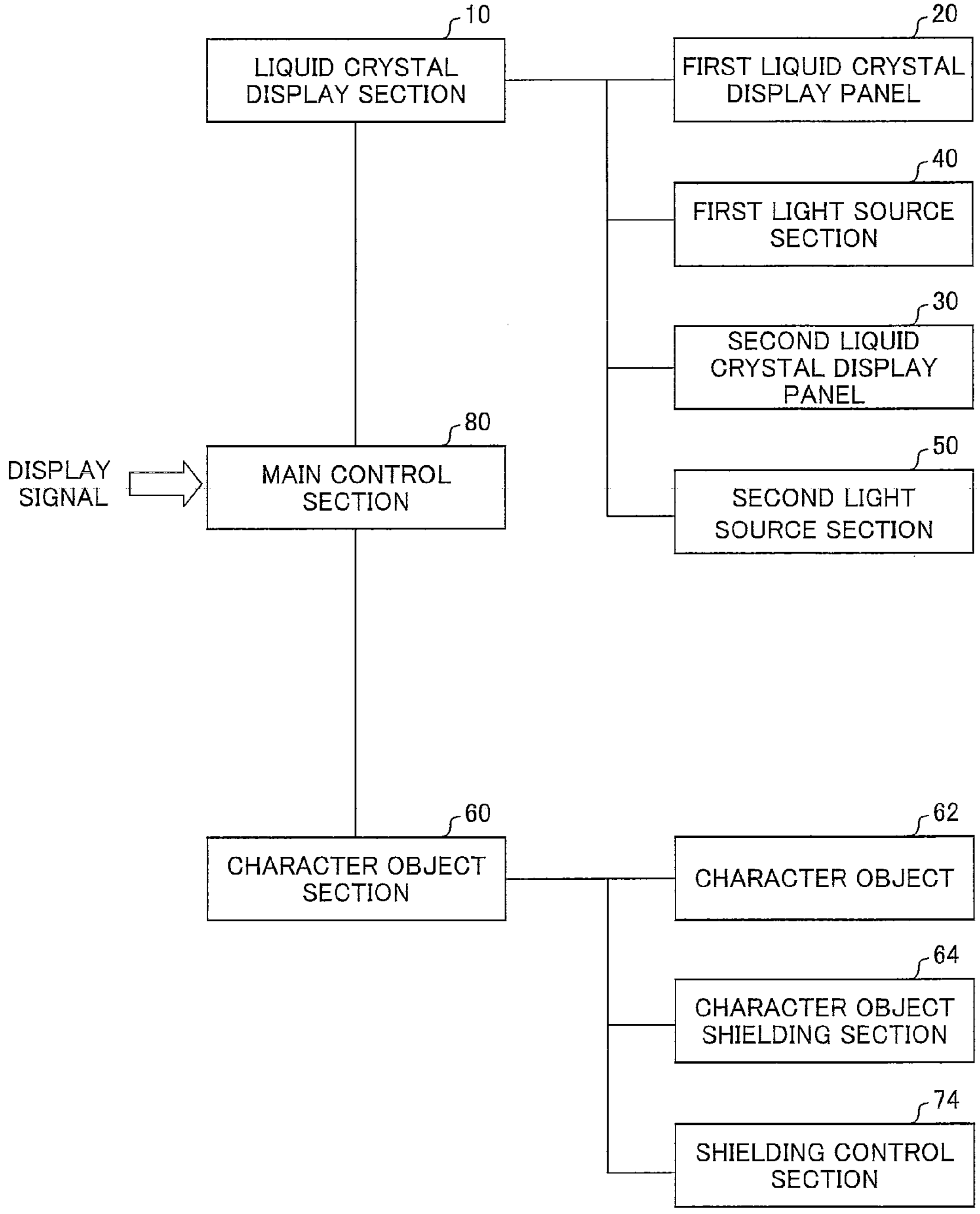
FIG. 14 is a block diagram schematically illustrating a liquid crystal display unit of an embodiment of the present invention.

The following description explains a configuration of the liquid crystal display unit 1 of the present embodiment, with reference to a block diagram. FIG. 14 is a block diagram schematically illustrating a configuration of the liquid crystal display unit 1 of the present embodiment.

As illustrated in FIG. 14, the liquid crystal display unit 1 of the present invention includes the liquid crystal display section 10, the character object section 60, and a main control section 80 for controlling the liquid crystal display section 10 and the character object section 60. The main control section 80 controls the liquid crystal display section 10 and character object section 60 in accordance with an inputted display signal. For example, the main control section 80 determines, depending on the display signal, whether the character object is being displayed or not, and controls the liquid crystal display section 10 and character object 60 based on this determination.

More specifically, the main control section 80 causes the display switching section 66 of the character object shielding section 64 to rotate, via a shielding control section 74 provided in the character object section 60, and further controls which of the reflecting section 67 or the transmitting part 68 of the display switching section 66 is to face the liquid crystal display section 10.

Second Embodiment

Another embodiment of the present invention is described below, with reference to (a) and (b) of FIG. 15, and FIG. 16.

Figure 15:
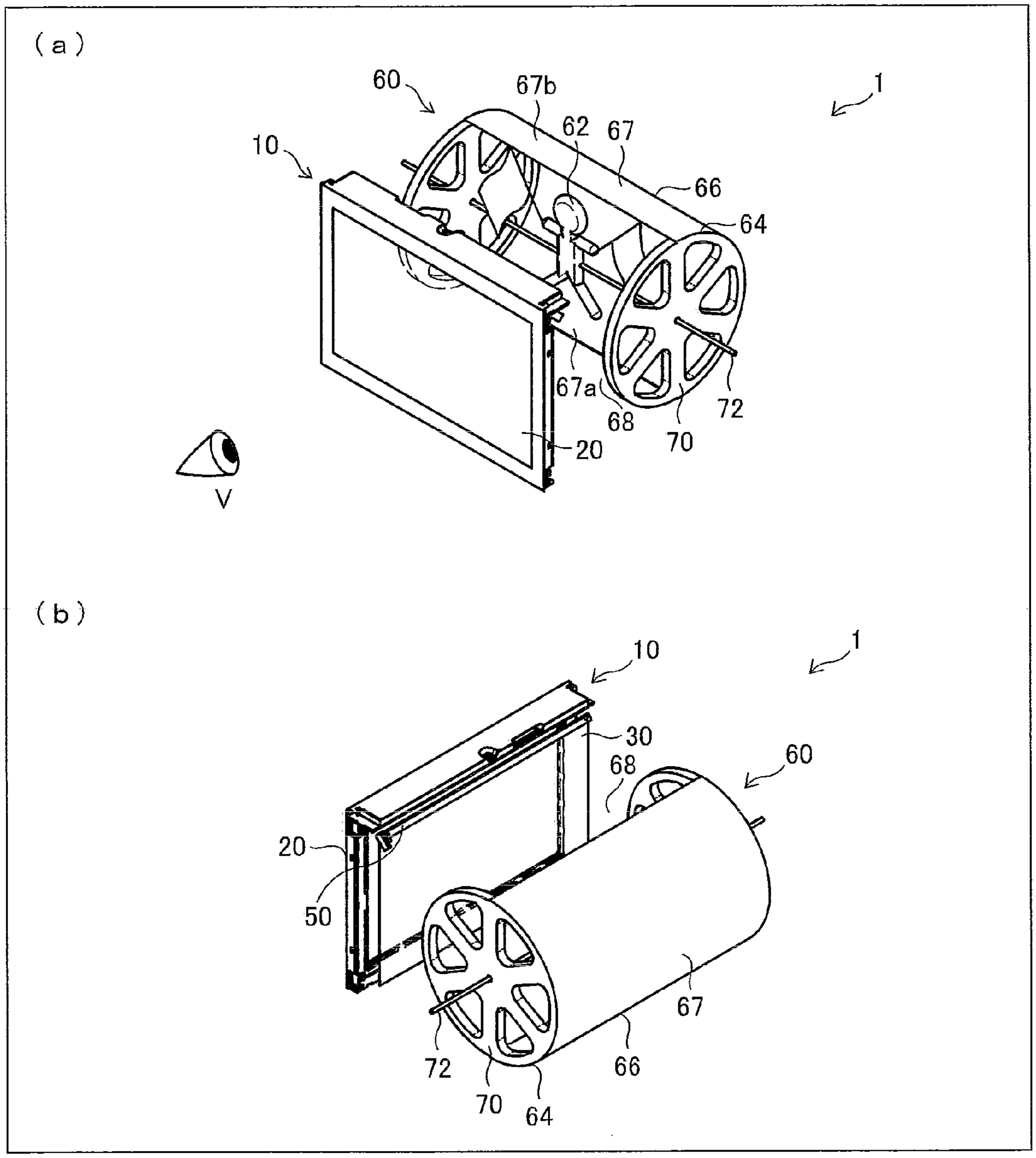
FIG. 15 is a diagram schematically illustrating a configuration of a liquid crystal display unit of another embodiment of the present invention; (a) illustrates the liquid crystal display unit seen from a front oblique direction, and (b) illustrates the liquid crystal display unit seen from a rear oblique direction.

Here, (a) and (b) of FIG. 15 are diagrams each schematically illustrating a configuration of another embodiment of a liquid crystal display unit of the present invention, while the character object is being displayed; (a) of FIG. 15 is a perspective view seen from a front side of the liquid crystal display unit, and (b) of FIG. 15 is a perspective view seen from a rear side of the liquid crystal display unit.

Figure 16:
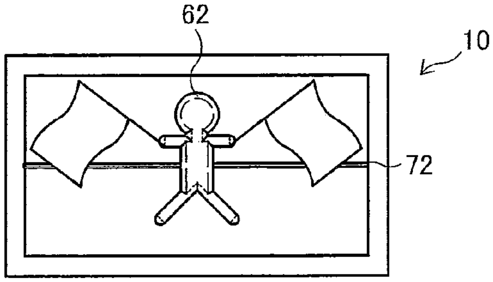
FIG. 16 is a diagram illustrating what is displayed on a liquid crystal display section in another embodiment of the present invention, while a character object is being displayed.

FIG. 16 is a diagram illustrating what is displayed on the liquid crystal display section of another embodiment of the present invention, while the character object is being displayed.

Any configurations other than what is explained in the present embodiment are identical to First Embodiment. For convenience, members that have identical functions to the members shown in the drawings of First Embodiment have been given identical reference signs, and explanations thereof are omitted.

The liquid crystal display unit 1 of the present embodiment differs from the liquid crystal display unit 1 of First Embodiment in the point that a reflective sheet 46 is not provided in the first light source section 40.

In the first light source section 40 of First Embodiment, the reflective sheet 46 is provided to portions corresponding to the first display region R1 and second display region R2. In comparison, no reflective sheet 46 is included in the first light source section 40 of the present embodiment.

This configuration allows the viewer V to see a larger character object 62 while the character object is being displayed.

Namely, the character object section 60 can be directly seen for substantially the entire liquid crystal display section 10, thereby allowing the character object 62 disposed in the character object section 60 to be enlarged in size to a size substantially equal to that of the liquid crystal display section 10.

Note that in the present embodiment, while no character object is displayed, the first liquid crystal display panel 20 is displayed by use of light (the light source light or external light) reflected from the outer reflecting section 67*b* of the character object shielding section 64, as its backlight.

(Game Device)

The liquid crystal display unit 1 of the present embodiment may be used for various devices, and for example, can be suitably used for game devices, particularly pachinko boards (pinball game devices).

Figure 17:
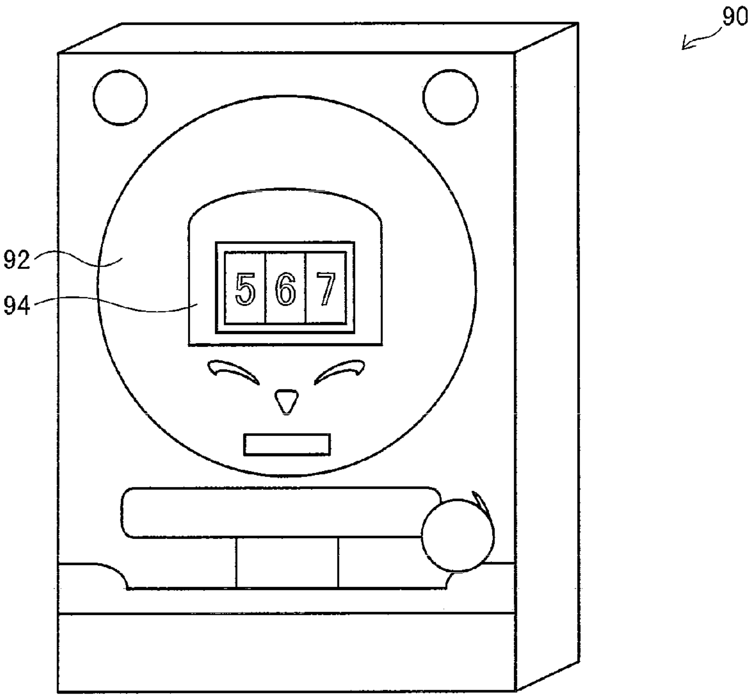
FIG. 17 is a diagram schematically illustrating a configuration of a game device.
Figure 18:
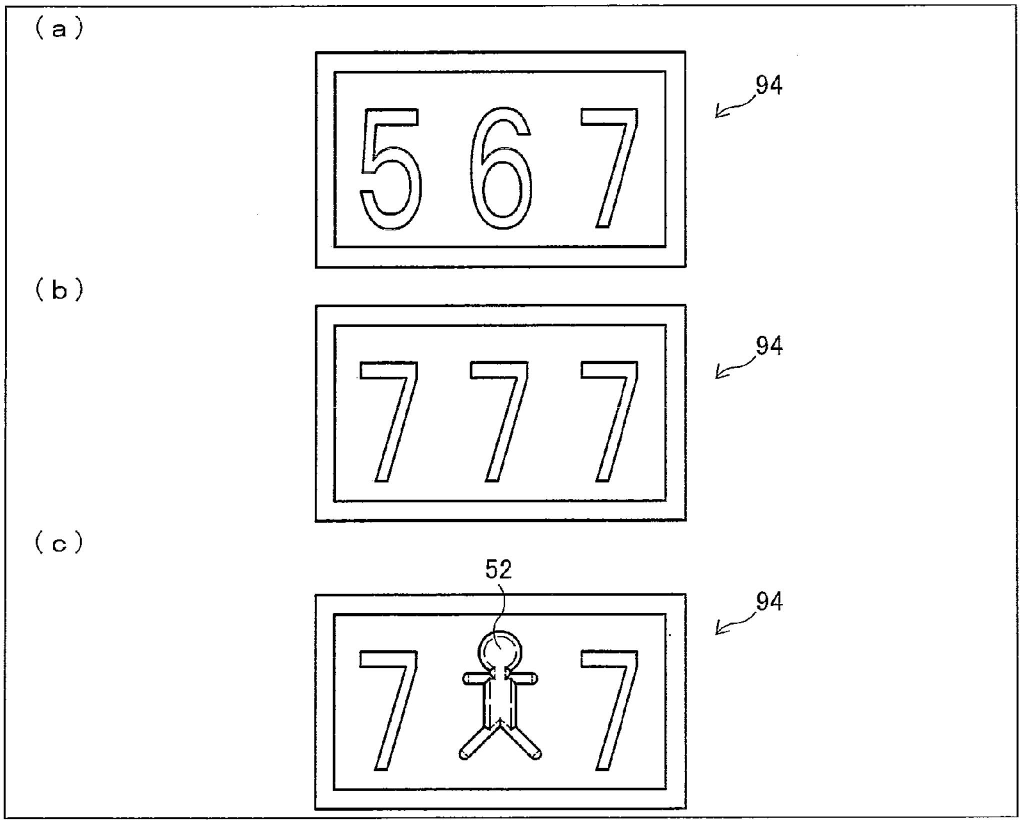
FIG. 18 is a diagram showing a display on an information display section of a game device.
Figure 19:
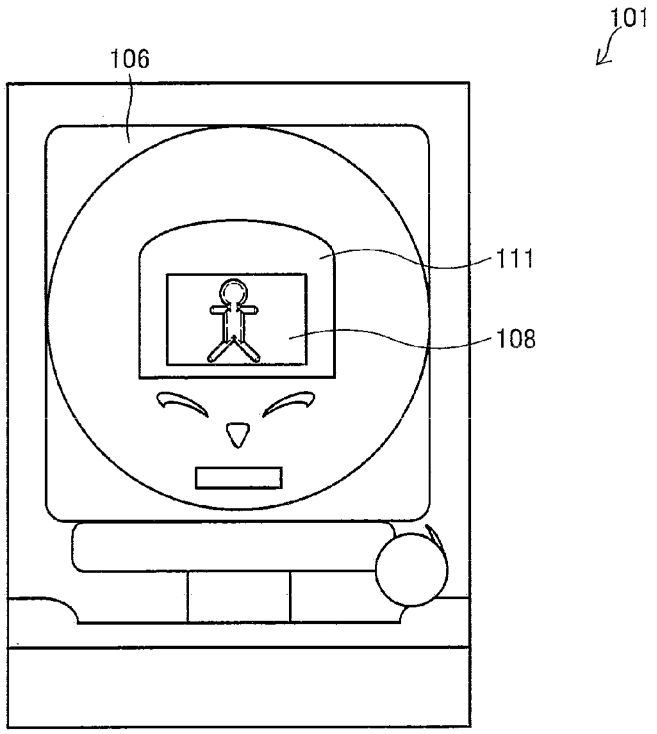
FIG. 19 is a front view illustrating a configuration of an entire game device disclosed in Patent Literature 1.
Figure 20:
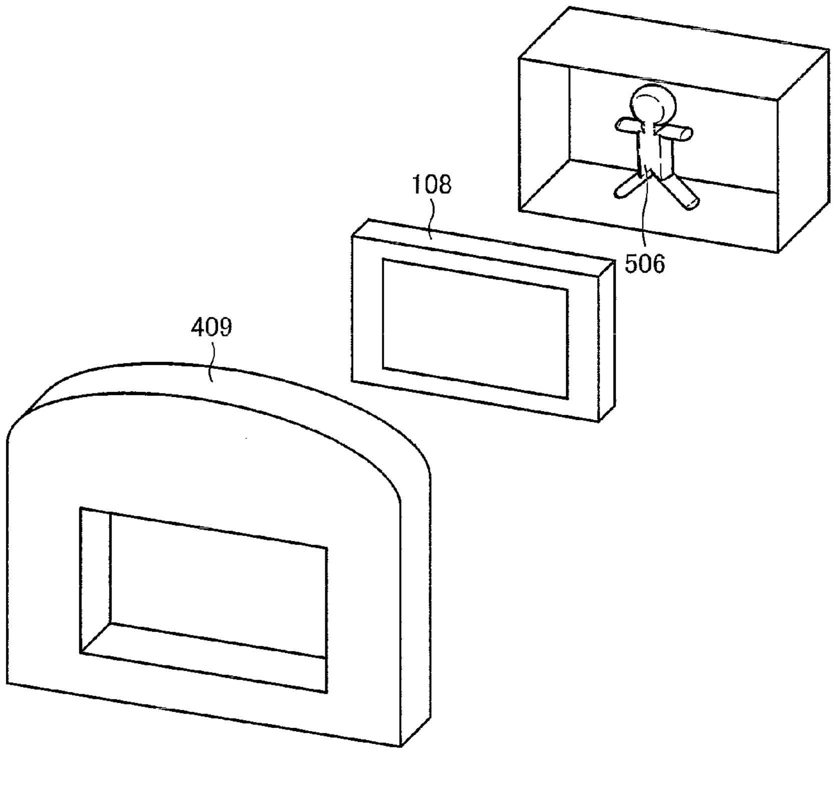
FIG. 20 is an exploded perspective view illustrating a configuration of a center case of the game device disclosed in Patent Literature 1.
Figure 21:
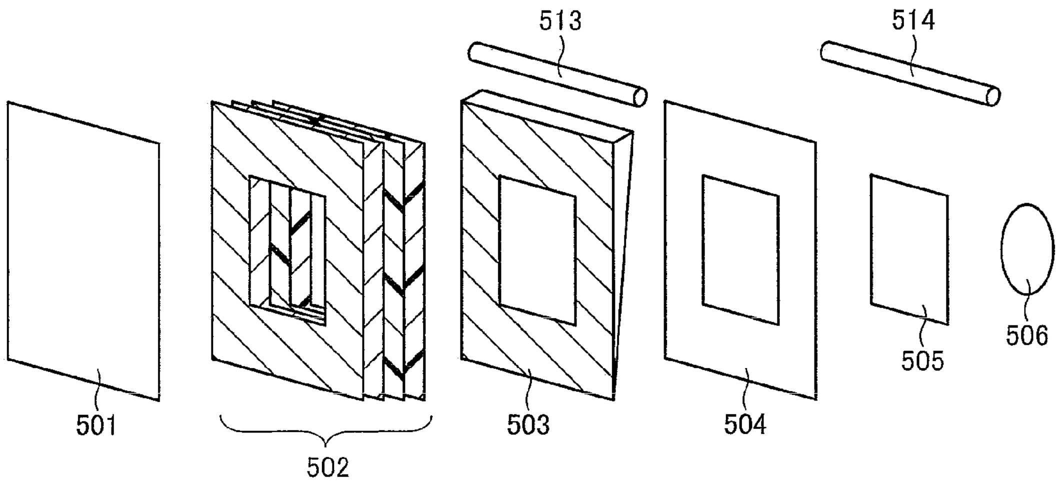
FIG. 21 is an explanatory diagram illustrating a configuration of an image display device of the game device disclosed in Patent Literature 1.
Figure 22:
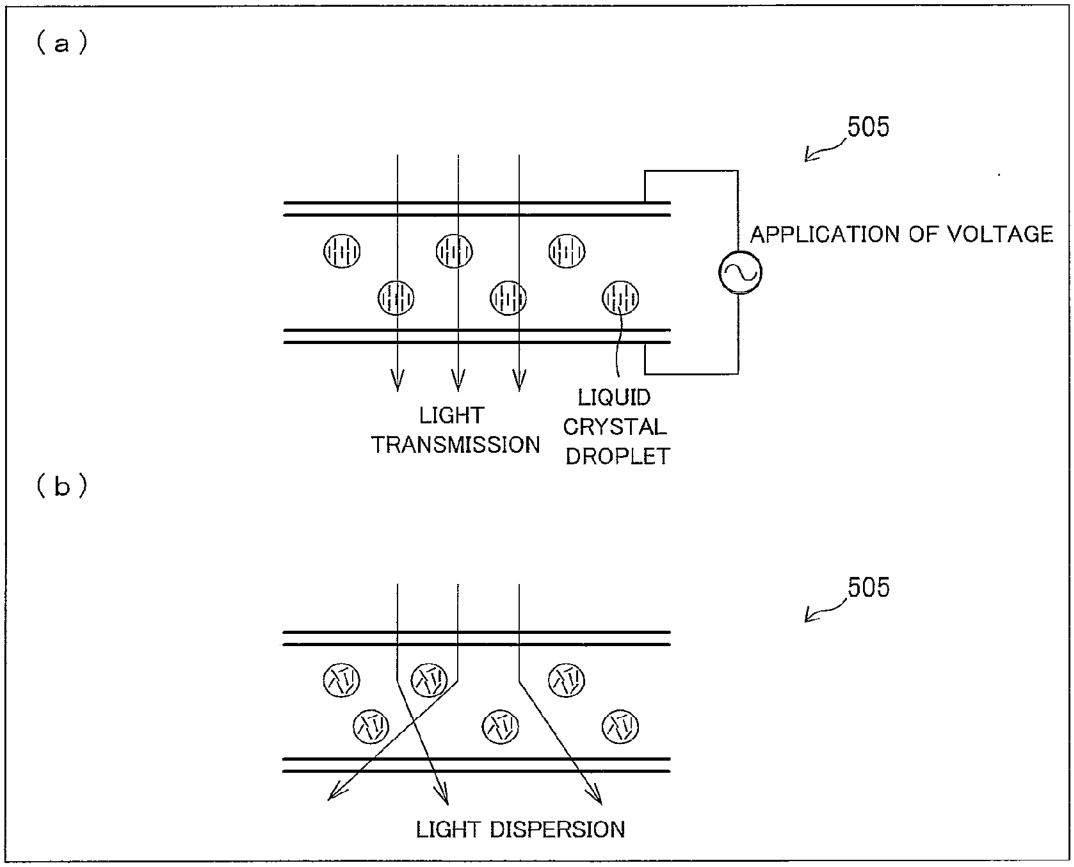
FIG. 22 is an explanatory diagram explaining a principle of operation of a polymer-dispersed liquid crystal of an LCD shutter of the game device disclosed in Patent Literature 1; (a) illustrates an alignment state of liquid crystal molecules while a voltage is applied, and (b) illustrates an alignment state of liquid crystal molecules while no voltage is applied.

Explained with reference to FIG. 17, in a pachinko board illustrated in FIG. 17 which is an example of a game device 90, the liquid crystal display unit 1 can be used as an information display section 94 of a game board 92.

In such a configuration, a game player of the game device 90 is the viewer V of the liquid crystal display unit 1. The game player can see (i) what is displayed on the first liquid crystal display element in the information display section 94 and (ii) the character object disposed behind the first liquid crystal display element.

(Other Configurations)

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

(Light Guide Plate)

For example, in the foregoing explanation, the light guide plate 44 in the first light source section 40 uses material that has a substantially uniform thickness throughout the entire light guide plate 44, however the configuration of the light guide plate 44 is not limited to such a configuration.

For example, the light guide plate 44 can be wedge-shaped, or can be of a shape combining a plurality of wedge-shapes.

However, in a case where the foregoing light guide plate 44 having a substantially even thickness is used, it is possible to increase uniformity of display within the display surface.

With use of a diagram schematically illustrating the liquid crystal display unit of an embodiment of the present invention described above, the following description deals with a liquid crystal display unit while the character object is being displayed, with reference to FIG. 13 which is a cross sectional view of such a liquid crystal display unit.

As illustrated in FIG. 13, for example in the third display region R3, light emitted from the character object 62 is transmitted through the light guide plate 44 and reaches the eyes of the viewer V. Here, in a case where the light guide plate 44 has an even thickness, an undistorted character object 62 is visible.

On the other hand, in a case where the light guide plate 44 has an uneven thickness, for example in a case where the cross-section of the light guide plate 44 is wedge-shaped and its thickness continuously changes, the transmitted light becomes in an ununiform state due to the difference in thickness. This causes the viewer V to see a distorted character object 62.

As a method for preventing generation of such a distortion in the character object 62 in a case where a light guide plate 44 whose cross-section is wedge-shaped is used, a region corresponding to the third display region R3 of the light guide plate 44 may be hollowed. This method of hollowing a region that corresponds to the third display region R3 of the light guide plate 44 is also applicable to a light guide plate that has an even thickness.

In a case where a light guide plate 44 that has an even thickness is used, it is preferable to provide two or more light source lamps provided to at least in the vicinity of sides of the light guide plate that face each other.

Such a configuration easily improves (i) brightness of a backlight emitted to the display surface and further (ii) uniformity of brightness in display, even if the light guide plate 44 has an even thickness.

Moreover, by adding an optical sheet between the light guide plate 44 of the first light source section and the first liquid crystal display panel, it is possible to improve brightness of the first liquid crystal display panel. In this case, depending on a surface of the optical sheet, the transmitting light may become ununiform due to a difference in light refraction. In such case, the viewer V sees a distorted character object 62.

Hence, in a case where an optical sheet is used, as a method for preventing the character object 62 from distorting, a method of hollowing a region of the optical sheet corresponding to the third display region R3 is possibly applied.

(Character Shielding Section)

Moreover, in the previous explanation, the character shielding section 64 is explained as a rotatable cylindrical member, in other words is exemplified as a reel-shaped drum. However, the character shielding section 64 of the present invention is not limited to this configuration.

Namely, as long as transmission and reflection of light is controllable in accordance with switching of whether the character object is being displayed or not, the character object shielding section may take any form. Other examples of the character object shielding section include a shutter device that slides sideways or up and down, and a double-door configuration.

(Second Liquid Crystal Display Panel)

Moreover, in the foregoing description, the second liquid crystal display panel, i.e., a shutter liquid crystal panel with respect to the character object 62 is explained by providing a polymer-dispersed type liquid crystal display element as its example. However, the second liquid crystal display panel of the present invention is not limited to this configuration.

That is to say, as long as transmission and reflection of light is controllable in accordance with switching of whether the character object is being displayed or not, the second liquid crystal display panel may be any liquid crystal display panel, and can be, for example, a regular TN (Twisted Nematic) liquid crystal display panel that uses a polarizing plate. In a case where the TN liquid crystal display panel is used as the second liquid crystal display panel, the character object 62 is sufficiently shielded while no character object is displayed.

In comparison, the polymer type liquid crystal display panel can carry out diffuse reflection of light or make itself bright, in a light-scattered state. Thus, it is possible to show what is displayed on the first liquid crystal display panel more brightly.

INDUSTRIAL APPLICABILITY

A liquid crystal display unit of the present invention is capable of displaying an image and a character object together, and therefore is suitably used for amusement equipment such as game devices.

The invention claimed is:

1. A display method for causing a liquid crystal display unit to display, said liquid crystal display unit comprising:

a first liquid crystal display element for displaying an image;

a character object model disposed behind the first liquid crystal display element; and a second liquid crystal display element, disposed between the first liquid crystal display element and the character object model, for shielding the character object model, said display method comprising the step of:

switching between (i) a display in which just an image displayed on the first liquid crystal display unit is shown to a viewer of the first liquid crystal display element while the character object model is being shielded and (ii) a display in which the character object model is shown to the viewer instead of shielding the character object model, the switching being carried out by a mechanical shielding device, disposed behind the second liquid crystal display element, for shielding the character object model.

2. The display method according to claim 1, wherein:

the mechanical shielding device is a rotatable drum device, the rotatable drum device has a rotating surface which has a transmitting part that transmits light and a non-transmitting part that does not transmit light, the character object model is disposed inside the rotatable drum device, just an image displayed on the first liquid crystal display unit is displayed while the non-transmitting part is being disposed between the viewer and the character object model after a rotation of the rotatable drum device, whereas the character object model is displayed while the transmitting part is being disposed between the viewer and the character object model.

3. The display method according to claim 2, wherein:

the second liquid crystal display element is a polymer-dispersed liquid crystal display element, and the polymer-dispersed liquid crystal display element is in a scattering state while the rotatable drum device is being rotated.

* * * * *